United States Patent
Taguchi et al.

(10) Patent No.: US 9,496,584 B2
(45) Date of Patent: Nov. 15, 2016

(54) WOUND-TYPE ACCUMULATOR HAVING SIMPLIFIED ARRANGEMENT OF A LITHIUM ION SOURCE

(75) Inventors: Makoto Taguchi, Hokuto (JP); Yuu Watanabe, Hokuto (JP);
(Continued)

(73) Assignee: JM Energy Corporation, Hokuto (JP)

(*) Notice: Subject to any disclaimer, the term of this patent is extended or adjusted under 35 U.S.C. 154(b) by 1548 days.

(21) Appl. No.: 13/141,180

(22) PCT Filed: Dec. 14, 2009

(86) PCT No.: PCT/JP2009/070823
§ 371 (c)(1),
(2), (4) Date: Jun. 21, 2011

(87) PCT Pub. No.: WO2010/073930
PCT Pub. Date: Jul. 1, 2010

(65) Prior Publication Data
US 2011/0256438 A1    Oct. 20, 2011

(30) Foreign Application Priority Data

Dec. 26, 2008 (JP) ................... 2008-333566
Dec. 26, 2008 (JP) ................... 2008-333567

(51) Int. Cl.
*H01M 10/0525* (2010.01)
*H01M 2/16* (2006.01)
(Continued)

(52) U.S. Cl.
CPC ......... *H01M 10/0525* (2013.01); *H01G 11/06* (2013.01); *H01G 11/28* (2013.01);
(Continued)

(58) Field of Classification Search
CPC .......... H01G 9/035; H01G 9/00; H01G 11/04; H01G 11/06; H01G 11/50; H01G 2009/0025; H01M 10/36
(Continued)

(56) References Cited

U.S. PATENT DOCUMENTS 6,461,769 B1 * 10/2002 Ando .................... H01M 4/137
429/128
2009/0246626 A1 * 10/2009 Tasaki et al. ................. 429/208

FOREIGN PATENT DOCUMENTS

JP        8 107048        4/1996
JP    2006 286919        10/2006
(Continued)

OTHER PUBLICATIONS

Abstract in English of JP 2007173615.*
(Continued)

*Primary Examiner* — Carlos Barcena
*Assistant Examiner* — Wojciech Haske
(74) *Attorney, Agent, or Firm* — Oblon, McClelland, Maier & Neustadt, L.L.P.

(57) ABSTRACT

A wound-type accumulator is equipped with a cylindrical wound electrode unit, which has belt-like positive electrode and negative electrode and configured by winding an electrode stack obtained by stacking the positive electrode and negative electrode through a separator from one end thereof, and an electrolytic solution. The negative electrode and/or the positive electrode is doped with lithium ions by electrochemical contact of the negative electrode and/or the positive electrode with a lithium ion source, intra-positive electrode spaces are formed in the positive electrode, and at least one lithium ion source is provided in the intra-positive electrode space or at a position opposing to the intra-positive
(Continued)

electrode space in the negative electrode in a state coming into no contact with the positive electrode.

13 Claims, 10 Drawing Sheets

(75) Inventors: Nobuo Ando, Hokuto (JP); Naoshi Yasuda, Hokuto (JP); Chisato Marumo, Hokuto (JP)

(51) Int. Cl.
*H01M 4/13* (2010.01)
*H01M 4/133* (2010.01)
*H01M 4/80* (2006.01)
*H01M 10/0587* (2010.01)
*H01G 11/06* (2013.01)
*H01G 11/28* (2013.01)
*H01G 11/82* (2013.01)

(52) U.S. Cl.
CPC .......... *H01G 11/82* (2013.01); *H01M 2/1673* (2013.01); *H01M 4/13* (2013.01); *H01M 4/133* (2013.01); *H01M 4/80* (2013.01); *H01M 10/0587* (2013.01); *Y02E 60/122* (2013.01); *Y02E 60/13* (2013.01)

(58) Field of Classification Search
USPC ............ 429/208, 64, 94; 361/502–505, 271, 361/278, 306.1, 306.3
See application file for complete search history.

(56) References Cited

FOREIGN PATENT DOCUMENTS

| JP | 2007 67105 | | 3/2007 |
|---|---|---|---|
| JP | 2007173615 A | * | 7/2007 |
| JP | 2008 60130 | | 3/2008 |
| JP | 2008060130 A | * | 3/2008 |
| JP | 2008 305928 | | 12/2008 |
| KR | 10-2008-0038083 A | | 5/2008 |
| WO | 2007 072713 | | 6/2007 |

OTHER PUBLICATIONS

Machine translation of Ueki et al. JP 2008060130 A (Mar. 2008).*
International Search Report issued Feb. 16, 2010 in PCT/JP09/70823 filed Dec. 14, 2009.
Korean Office Action issued May 22, 2015 in Patent Application No. 10-2011-7014964 (with English Translation).

* cited by examiner

WOUND-TYPE ACCUMULATOR HAVING SIMPLIFIED ARRANGEMENT OF A LITHIUM ION SOURCE

CROSS-REFERENCE TO RELATED APPLICATION

This application is a national phase application based on PCT/JP2009/070823, filed on Dec. 14, 2009. This application is also based upon and claims the benefit of priority under 35 U.S.C. §119 from prior Japanese Patent Application Nos. 2008-333566 and 2008-333567, both filed on Dec. 26, 2008. The entire contents of each of the above applications are incorporated herein by reference.

TECHNICAL FIELD

The present invention relates to a wound-type accumulator having a wound electrode unit configured by stacking and winding a positive electrode and a negative electrode through a separator.

BACKGROUND ART

In recent years, a battery having a negative electrode composed of a carbonaceous material such as graphite and a positive electrode composed of a lithium-containing metal oxide such as $LiCoO_2$ has been developed. This battery is the so-called rocking chair-type battery that lithium ions are supplied to the negative electrode from the lithium-containing metal oxide making up the positive electrode by charging after assembly of the battery, and the lithium ions are then returned to the positive electrode from the negative electrode by discharging, is called a lithium ion secondary battery because only lithium ions participate in charge/discharge without using metal lithium in the negative electrode and is distinguished from a lithium battery using lithium metal. This lithium ion secondary battery is characterized by high voltage, high capacity and high safety.

Under the circumstances that environmental problems are greatly taken up, developments of a storage system of clean energy by solar photovoltaic power generation or wind power generation and a power source used in electric cars or hybrid electric cars taking the place of gasoline cars have been energetically made. More recently, with the development of high-performance and high-function devices and equipments for automotive use, such as power windows and IT-related instruments, there has been a demand for development of a new power source having a high energy density and a high power density.

As an accumulator meeting uses of which high energy density and high power density properties are required, attention has been recently paid to an accumulator called a hybrid capacitor with the principles of electricity accumulation in the lithium ion secondary battery and the electric double layer capacitor combined. As such a hybrid capacitor, there has been proposed an organic electrolyte capacitor having a negative electrode composed of a carbonaceous material capable of occluding and deoccluding lithium ions, by which a high energy density is achieved by lowering the potential of the negative electrode by causing lithium ions to be occluded and supported (hereinafter also referred to as "doped") in the carbonaceous material in advance by a chemical method or electrochemical method (see, for example, Patent Literature 1).

In such an organic electrolyte capacitor, high performance is expected. However, the capacitor involves problems that it takes an extremely long time to dope the negative electrode with lithium ions in advance and that it is necessary to uniformly support the lithium ions in the whole negative electrode, and thus it was said that difficulty is encountered on putting the capacitor to practical use as, in particular, a large-scale and high-capacity cell such as a cylindrical battery with electrodes wound or a rectangular battery with a plurality of electrodes laminated.

In order to solve these problems, there has been proposed a wound-type accumulator comprising a cylindrical wound electrode unit equipped with a positive electrode and a negative electrode that each have a current collector with pores passing through from a front surface to a back surface formed therein, said negative electrode being composed of a negative electrode active material capable of reversibly supporting lithium ions, said positive electrode and negative electrode being wound in a state stacked on each other through a separator, and a lithium ion source provided on any of an outer peripheral surface and an inner peripheral surface in the wound electrode unit, wherein the negative electrode is doped with lithium ions by electrochemical contact of the negative electrode with lithium metal (see, for example, Patent Literature 2).

In this wound-type accumulator, the pores passing through from the front surface to the back surface are provided in the current collectors, so that the lithium ions are not interrupted by the current collectors even when the lithium ion source is arranged on any of the outer peripheral surface and the inner peripheral surface in the wound electrode unit, and move between the electrodes through the pores in the current collectors, whereby not only a negative electrode portion near to the lithium ion source, but also a negative electrode portion distant from the lithium ion source can be electrochemically doped with the lithium ions.

In the negative electrode obtained by doping a carbonaceous material or the like, which can occlude and deocclude lithium ions, with the lithium ions in advance, the potential thereof becomes lower than active carbon used in the electric double layer capacitor as described above, so that withstand voltage in a cell combined with a positive electrode active carbon is improved, and since the capacity of the negative electrode is extremely large compared with the active carbon, a high energy density is achieved by the wound-type accumulator equipped with this negative electrode.

However, in such a wound-type accumulator, the lithium metal is provided on only any one of the outer peripheral surface and the inner peripheral surface of the electrode element, so that this accumulator involves a problem that it takes a long time to uniformly dope the whole negative electrode with lithium ions. When the lithium ion source is provided on only the outer peripheral surface of the wound electrode unit, high voltage and high capacity are achieved, but the amount of the lithium ions to dope becomes large, so that it is necessary to use a lithium ion source having a great thickness and thus there is a problem that a packing amount of the electrodes becomes low to encounter difficulty on achieving a sufficiently high energy density.

In order to solve such a problem, there has been proposed a wound-type accumulator comprising a cylindrical wound electrode unit configured by winding a positive electrode with an electrode layer containing a positive electrode active material capable of reversibly supporting lithium ions and/or anions formed on at least one surface of a current collector having pores passing through from a front surface to a back surface, and a negative electrode with an electrode layer containing a negative electrode active material capable of reversibly supporting lithium ions formed on at least one surface of a current collector having pores passing through from a front surface to a back surface in a state stacked on each other through a separator, and lithium ion sources provided on both outer peripheral surface and inner peripheral surface in the wound electrode unit, wherein the negative electrode and/or the positive electrode is doped with lithium ions by electrochemical contact of the negative electrode and/or the positive electrode with the lithium ion sources (see, for example, Patent Literature 3).

PRIOR ART LITERATURE

Patent Literature

Patent Literature 1: Japanese Patent Application Laid-Open No. 8-107048
Patent Literature 2: Japanese Patent No. 3485935
Patent Literature 3: Japanese Patent Application Laid-Open No. 2007-67105

DISCLOSURE OF THE INVENTION

Technical Problem

However, in such a wound-type accumulator, it has been proved that it takes a long time for penetration of an electrolytic solution, and it also takes a long period of time to uniformly dope the whole negative electrode with the lithium ions, and so high productivity is not achieved. This is considered to be attributable to the fact that since the surface of the wound electrode unit is covered with the lithium ion source, the electrolytic solution is hard to be diffused into the interior of the wound electrode unit. In particular, when a large-scale wound-type lithium ion battery was produced, the time required for doping was increased to, for example, about 30 days because the number of times of winding was added, so that the productivity thereof was markedly low.

In the wound-type accumulator described in Patent Literature 3, the wound electrode unit is assembled, and the lithium ion sources are then arranged on the inner peripheral surface and outer peripheral surface thereof, so that a production process is complicated, thereby involving a problem that high productivity is not achieved.

The present invention has been made on the basis of the foregoing circumstances and has as its object the provision of a wound-type accumulator, by which arrangement of a lithium ion source can be simplified, and the time required to inject an aprotic organic solvent electrolyte solution and the time required to dope a negative electrode and/or a positive electrode with lithium ions in advance (hereinafter, this action is also referred to as "predoping") can be shortened, and thus the assembly of the accumulator can be completed in a short period of time to achieve high productivity.

Another object of the present invention is to provide a wound-type accumulator, by which an electrolytic solution is penetrated into the interior of a wound electrode unit in a short period of time, electrodes are uniformly doped with lithium ions in a short period of time, and high productivity is achieved.

Solution to Problem

A wound-type accumulator according to the present invention comprises a cylindrical wound electrode unit, which has a positive electrode with an electrode layer containing a positive electrode active material capable of reversibly supporting lithium ions and/or anions formed on at least one surface of a current collector having pores passing through from a front surface to a back surface, and a negative electrode with an electrode layer containing a negative electrode active material capable of reversibly supporting lithium ions formed on at least one surface of a current collector having pores passing through from a front surface to a back surface and is configured by winding an electrode stack obtained by stacking the positive electrode and the negative electrode on each other through a separator from one end thereof, and an electrolytic solution composed of an aprotic organic solvent electrolyte solution of a lithium salt, wherein the negative electrode and/or the positive electrode is doped with lithium ions by electrochemical contact of the negative electrode and/or the positive electrode with a lithium ion source, and wherein the lithium ion source is provided so as to come into contact with neither the positive electrode nor the negative electrode by virtue of the separator.

In the wound-type accumulator according to the present invention, it may be preferable that intra-positive electrode spaces are formed in the positive electrode, and at least one lithium ion source is provided in the intra-positive electrode space or at a position opposing to the intra-positive electrode space in the negative electrode in a state coming into no contact with the positive electrode.

In such a wound-type accumulator, it may be preferable that an outermost peripheral portion and/or an innermost peripheral portion in the wound electrode unit is composed of the separator, and the lithium ion source is provided on an inner peripheral surface of the outermost peripheral portion and/or an inner peripheral surface of the innermost peripheral portion in the wound electrode unit.

The wound electrode unit may also be configured by covering a wound body of the lithium ion source to be provided on the inner peripheral surface of the innermost peripheral portion in the wound electrode unit with the negative electrode and then inserting and winding the positive electrode.

It may also be preferable that the positive electrode has a plurality of positive electrode pieces, and the respective positive electrode pieces are arranged to each other through the intra-positive electrode space.

It may further be preferable that slits are formed in the positive electrode, and the intra-positive electrode spaces are made up of the slits.

It may still further be preferable that the negative electrode is superimposed on at least a part of the positive electrode.

It may yet still further be preferable that the wound electrode unit is configured by covering a wound body to be covered with the lithium ion source provided in the intra-positive electrode space or at the position opposing to the intra-positive electrode space in the negative electrode with the outermost peripheral portion of the negative electrode and then inserting and winding this lithium ion source.

In the wound-type accumulator according to the present invention, it may be preferable that an outermost peripheral portion and/or an innermost peripheral portion in the wound electrode unit is composed of the separator, and the lithium ion source is provided on an inner peripheral surface of the outermost peripheral portion and/or an inner peripheral surface of the innermost peripheral portion in the wound electrode unit, and wherein proportions of regions not covered with the lithium ion source in the inner peripheral surface of the outermost peripheral portion and/or an inner peripheral surface of the innermost peripheral portion in the wound electrode unit, on which the lithium ion source has been provided, are each 10 to 70%.

In such a wound-type accumulator, it may be preferable that the electrode stack is configured by stacking a first separator, the negative electrode, a second separator and the positive electrode in this order, the lithium ion source provided on the inner peripheral surface of the innermost peripheral portion in the wound electrode unit is arranged on a surface opposing to the surface, on which the negative electrode is arranged, at one end portion of the first separator, and the electrode stack is wound from the one end portion, whereby the wound electrode unit is configured.

In the wound-type accumulator according to the present invention, the lithium ion source may preferably be bonded under pressure to or stacked on a lithium electrode current collector.

The lithium electrode current collector, on which the lithium ion source has been bonded under pressure or stacked, may preferably be composed of a porous foil.

In the wound electrode unit, it may be preferable that an outermost peripheral portion of the positive electrode is covered with an outermost peripheral portion of the negative electrode through the separator, the outermost peripheral portion of the negative electrode is covered with an outermost peripheral portion of the separator, and the lithium ion source is provided on an inner peripheral surface of the outermost peripheral portion of the separator.

The wound-type accumulator according to the present invention is suitable for use as a lithium ion capacitor or lithium ion secondary battery.

Advantageous Effects of the Invention

The following effects are achieved by the wound-type accumulator according to the present invention.

According to the construction that at least one lithium ion source is provided in the intra-positive electrode space formed in the positive electrode or at a position opposing to the intra-positive electrode space in the negative electrode in a state coming into no contact with the positive electrode, the wound electrode unit is configured by arranging the lithium ion source in the intra-positive electrode space or intra-negative electrode space to form the electrode stack and winding the stack, so that the wound electrode unit can be simply assembled, and thus the assembly can be completed in a short period of time, and the predoping time can be shortened because the lithium ion source is arranged in the intra-positive electrode space or intra-negative electrode space. As a result, high productivity can be achieved.

Incidentally, if the lithium ion source is arranged between a positive electrode and a negative electrode that are arranged in opposition to each other, problems that a distance between the positive electrode and the negative electrode partially varies, lithium metal remains between the positive electrode and the negative electrode, and lithium metal deposits on the lithium electrode current collector when the lithium ion source is laminated on the lithium electrode current collector may be caused in some cases though speeding-up of predoping can be made.

According to the wound-type accumulator produced in this manner, the internal resistance thereof is reduced, and both high performance and high durability are achieved even when the assembly is completed in a short period of time because speeding-up and evenness of predoping are made.

According to the construction that the outermost peripheral portion and/or the innermost peripheral portion in the wound electrode unit is composed of the separator, the lithium ion source is provided on the inner peripheral surface of the outermost peripheral portion and/or the inner peripheral surface of the innermost peripheral portion in the wound electrode unit, and the proportions of regions not covered with the lithium ion source in the inner peripheral surface of the outermost peripheral portion and/or the inner peripheral surface of the innermost peripheral portion in the wound electrode unit, on which the lithium ion source has been provided, are each 10 to 70%, the electrolytic solution penetrates into the interior of the wound electrode unit in a short period of time, and the whole electrode is uniformly doped with lithium ions in a short period of time, so that high productivity is achieved.

In addition, the preparation of the wound electrode unit and the arrangement of the lithium ion source can be conducted in the same step by winding the electrode stack in a state that the lithium ion source has been arranged on the separator in advance, so that higher productivity is achieved.

BEST MODE FOR CARRYING OUT THE INVENTION

The wound-type accumulators according to the present invention will hereinafter be described about the case where they are embodied as a wound-type lithium ion capacitor (hereinafter also referred to as "wound-type LIC").

First Embodiment

Figure 1:
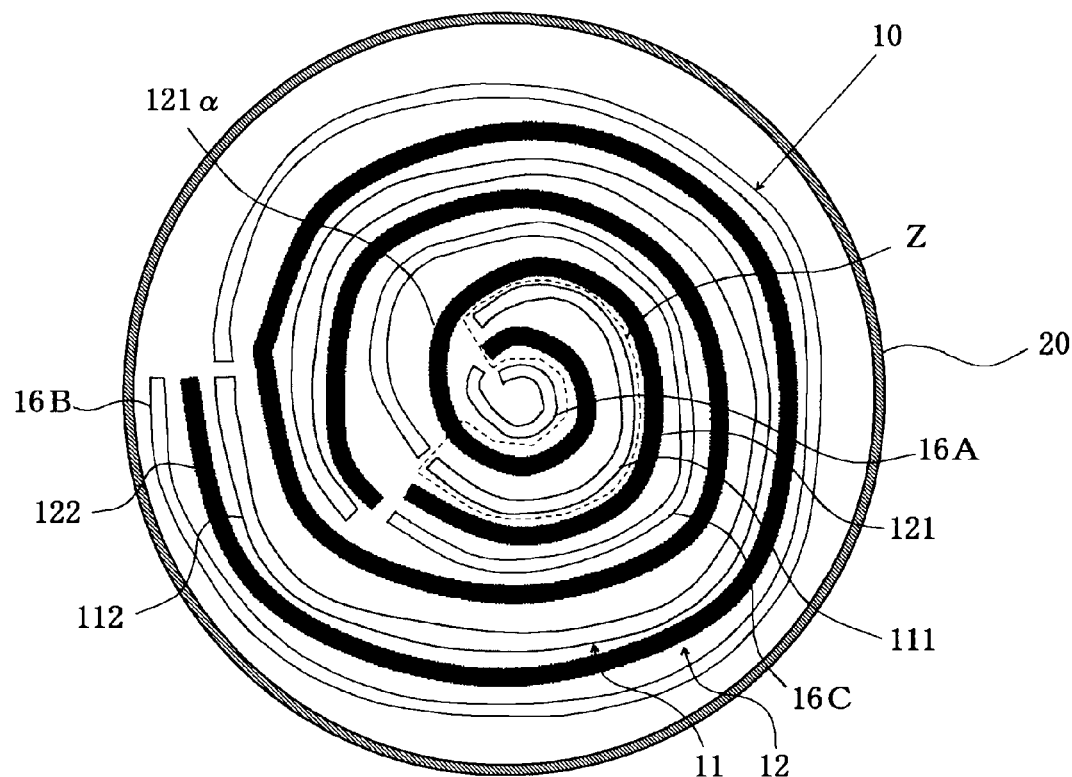
FIG. 1 is an explanatory cross-sectional view typically illustrating the construction of a wound-type lithium ion capacitor according to a first embodiment of the present invention.
Figure 2:
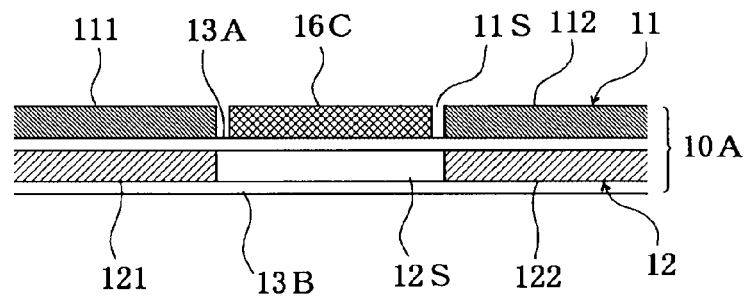
FIG. 2 is an explanatory cross-sectional view typically illustrating a sectional state of an electrode stack configured by releasing the wound state of a wound electrode unit of the wound-type lithium ion capacitor in FIG. 1.

FIG. 1 is an explanatory cross-sectional view typically illustrating the construction of a wound-type LIC according to a first embodiment of the present invention, and FIG. 2 is an explanatory cross-sectional view typically illustrating a sectional state of an electrode stack configured by releasing the wound state of a wound electrode unit of the wound-type LIC in FIG. 1.

The wound-type LIC of this embodiment has a cylindrical wound electrode unit 10 configured by winding a belt-like positive electrode 11 having intra-positive electrode spaces 11S and a belt-like negative electrode 12 having intra-negative electrode spaces 12S through a separator, specifically, winding an electrode stack 10A obtained by stacking the negative electrode 12, a separator 13A and the positive electrode 11 in this order on a separator 13B from one end portion thereof, and is fabricated by housing this wound electrode unit in a cylindrical outer container 20 and filling the interior of the container with an electrolytic solution composed of an aprotic organic solvent electrolyte solution of a lithium salt.

An outermost peripheral portion and an innermost peripheral portion in this wound electrode unit 10 is each composed of the separator (not illustrated in FIG. 1), lithium ion sources 16A and 16B are provided on an inner peripheral surface of the outermost peripheral portion and an inner peripheral surface of the innermost peripheral portion, respectively, and a lithium ion source 16C is provided in the intra-positive electrode space 11S in a state coming into no contact with the positive electrode 11. The lithium ion sources 16A to 16C are preferably arranged in a state coming into no contact with the negative electrode 12 through the separators 13A and 13B.

In such a wound-type LIC, the negative electrode 12 is short-circuited to the lithium ion sources 16A to 16C, and the negative electrode 12 and/or the positive electrode 11 is doped with lithium ions and/or anions by electrochemical contact of the negative electrode 12 and/or the positive electrode 11 with the lithium ion sources 16A to 16C.

Incidentally, "the positive electrode" in the present invention means an electrode from which an electric current flows out upon discharging and into which an electric current flows upon charging, and "the negative electrode" means an electrode into which an electric current flows upon discharging and from which an electric current flows out upon charging.

Figure 3:
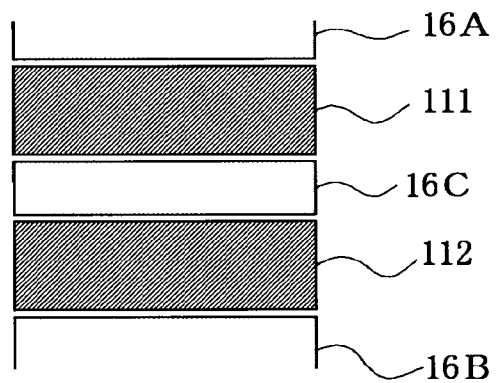
FIG. 3 is an explanatory plan view typically illustrating an exemplary structure of a positive electrode.

As also illustrated in FIG. 3, a specific structure of the positive electrode 11 is such that the electrode has a plurality of positive electrode pieces (2 pieces in FIG. 1 to FIG. 3) 111 and 112, and the respective positive electrode pieces 111 and 112 are arranged to each other through the intra-positive electrode space 11S.

A specific structure of the negative electrode 12 is such that the electrode has a plurality of negative electrode pieces (2 pieces in FIG. 1 and FIG. 2) 121 and 122 like the positive electrode 11, and the respective negative electrode pieces 121 and 122 are arranged to each other through the intra-negative electrode space 12S.

In the wound electrode unit 10 obtained by stacking such positive electrode 11, negative electrode 12 and lithium ion sources 16A to 16C on the separators 13A and 13B and winding the resultant stack, the positive electrode 11 is preferably superimposed on the negative electrode 12 over the whole length thereof. In the present invention, the state that the negative electrode and the positive electrode have been superimposed on each other means a state that both electrodes have been stacked on each other without interposing any other layer than a separator between them.

Specifically, the wound electrode unit 10 is preferably configured by covering a wound body of the lithium ion source 16A provided on an inner peripheral surface of an innermost peripheral portion of the separator with the negative electrode piece 121 and then inserting and winding the positive electrode piece 111. The wound electrode unit is also preferably configured by covering an outer peripheral surface of a pair of electrode portions (for example, a portion surrounded by a chain line Z in FIG. 1) composed of a positive electrode portion (111) and a negative electrode portion (121), which oppose to each other, with a marginal portion (121α) of the negative electrode portion (121) in the pair of electrode portions to form a wound body, covering an outer peripheral surface of the wound body with the lithium ion source 16C provided in the intra-positive electrode space 11S and further covering an outer peripheral surface of the wound body in this covered state with another pair of electrode portions. The wound electrode unit is further preferably configured by covering the wound body to be covered with the lithium ion source 16B provided on the inner peripheral surface of the outermost peripheral portion of the separator with the outermost peripheral portion of the negative electrode and then inserting and winding this lithium ion source.

High durability is given to the wound-type LIC by virtue of such a construction. Incidentally, if the lithium ion source is opposed to the positive electrode without interposing the negative electrode between them, predoping becomes insufficient, resulting in remaining of lithium metal, and arborescent lithium metal called dendrite deposits on the lithium electrode current collector according to conditions for charge/discharge when the lithium ion source is stacked for use on the lithium electrode current collector, which may form the cause of short circuit in some cases.

FIG. 1 illustrates the construction that one lithium ion source 16C is arranged between two pairs of electrode portions. However, the pairs of electrode portions are not limited to the two pairs, and the wound electrode unit may also be made up of three pairs or more of electrode portions. In such a case, the wound electrode unit is configured by arranging the lithium ion source between at least one set of two pairs of electrode portions among them.

Figure 4:
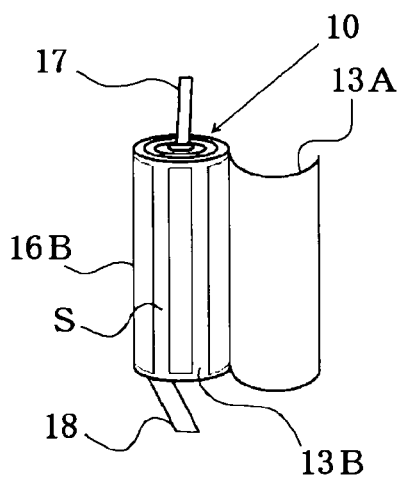
FIG. 4 is an explanatory perspective view illustrating the wound electrode unit in the wound-type lithium ion capacitor illustrated in FIG. 1.

Intermittent portions S (see FIG. 4) free of the lithium ion sources 16A to 16C are preferably respectively formed in the lithium ion sources 16A and 16B respectively provided on the inner peripheral surface of the innermost peripheral portion and the inner peripheral surface of the outermost peripheral portion in the wound electrode unit 10, and the lithium ion source 16C inserted into the space formed in the outer peripheral surface of the wound body composed of the pairs of electrode portions, and proportions (hereinafter also referred to as "non-lithium electrode occupied rates") of the intermittent portions S in each of the lithium ion sources 16A to 16C are each preferably 10 to 70%, more preferably 15 to 50%, particularly preferably 20 to 30%.

The lithium ion sources 16A to 16C are each formed by arranging plate-like lithium ion source pieces in parallel through the intermittent portion(s) S.

If the non-lithium electrode occupied rate in each of the lithium ion sources 16A to 16C is less than 10% of its corresponding peripheral surface, it takes a long time for penetration of the aprotic organic solvent electrolyte solution to fail to shorten the time required to inject the solution. If the non-lithium electrode occupied rate in each of the lithium ion sources 16A to 16C exceeds 70% of its corresponding peripheral surface on the other hand, the area of the lithium ion source supplying lithium ions and/or anions to the positive electrode and/or the negative electrode becomes small, so that it takes a long time to complete the predoping to fail to shorten the time required for the predoping.

When the non-lithium electrode occupied rate in each of the lithium ion sources 16A to 16C is 20 to 30% of its corresponding peripheral surface, both shortening of the time required for penetration of the aprotic organic solvent electrolyte solution and shortening of the time required for the predoping can be made.

The spaces are preferably uniformly distributed and formed throughout the whole region. For example, a plurality of lithium ion sources each having a small area are preferably arranged apart from each other without using a lithium ion source having a large area, thereby forming the fixed spaces. The flow passages of the aprotic organic solvent electrolyte solution can thereby widely ensured. In addition, a lithium ion source having a large area with pores formed therein by punching or the like is more preferably used because the fixed spaces are obtained by the one lithium ion source.

Figure 5:
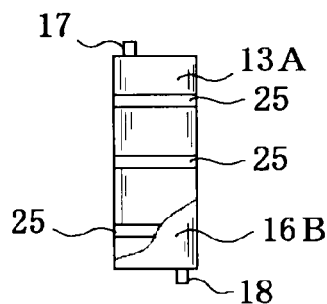
FIG. 5 is an explanatory front view illustrating the wound electrode unit in the wound-type lithium ion capacitor illustrated in FIG. 1.

Such a wound electrode unit 10 is preferably housed into the outer container 20 in a state that the wound body obtained by winding the electrode stack 10A has been fixed from the outside by tapes 25 as illustrated in FIG. 5 from the viewpoint of assembly workability of the wound-type LIC. Incidentally, in FIG. 5, numeral references 17 and 18 designate a positive electrode terminal electrically connected to the positive electrode and a negative electrode terminal electrically connected to the negative electrode, respectively. In FIG. 5, these terminals extend in opposite directions to each other in the wound electrode unit 10, but may extend in the same direction.

[Winding Method of Electrode Stack]

Figure 6:
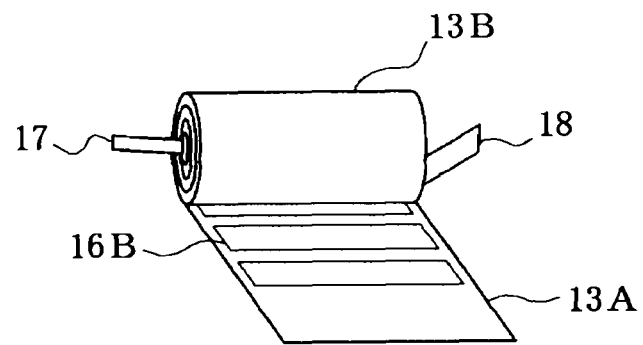
FIG. 6 is an explanatory view illustrating an exemplary method for inserting a lithium ion source at an outer peripheral surface.
Figure 7:
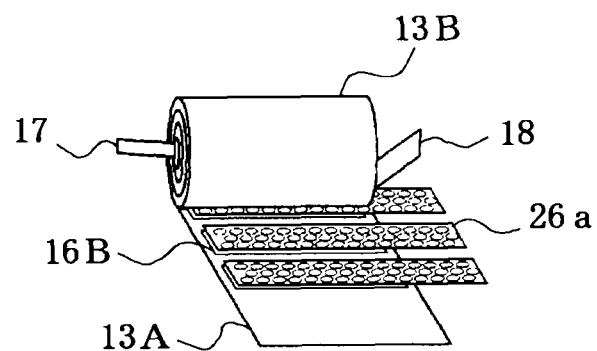
FIG. 7 is an explanatory view illustrating an exemplary method for inserting a lithium electrode current collector at the outer peripheral surface.
Figure 8:
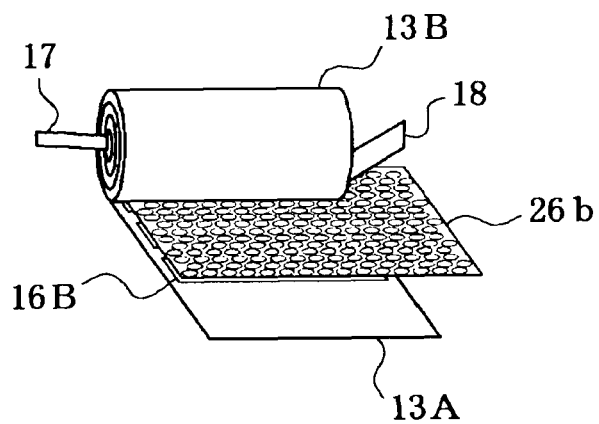
FIG. 8 is an explanatory view illustrating another exemplary method for inserting a lithium electrode current collector at the outer peripheral surface.

In an assembly step of such a wound electrode unit 10 as described above, the insertion of the lithium ion source 16B provided on the inner peripheral surface of the outermost peripheral portion is preferably conducted by winding the lithium ion source 16B in a state bonded under pressure to the separator 13A in advance as illustrated in FIG. 6 from the viewpoint of shortening of the assembly time. A lithium electrode current collector 26a (26b) is bonded under pressure to the lithium ion source 16B so as to be brought into close contact with the lithium ion source 16B bonded under pressure to the separator 13A as illustrated in FIGS. 7 and 8, and wound, whereby the lithium ion source 16B can be electrically connected to the negative electrode 12 to form a short-circuit between both.

Figure 9:
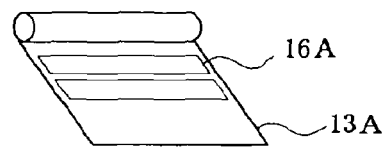
FIG. 9 is an explanatory view illustrating an exemplary method for inserting a lithium ion source at an inner peripheral surface.
Figure 10:
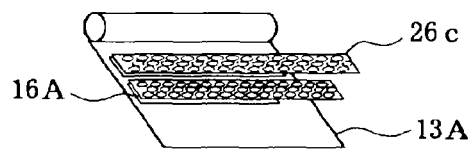
FIG. 10 is an explanatory view illustrating an exemplary method for inserting a lithium electrode current collector at the inner peripheral surface.

In the assembly step of the wound electrode unit 10, the insertion of the lithium ion source 16A provided on the inner peripheral surface of the innermost peripheral portion is preferably conducted by winding the lithium ion source 16A in a state bonded under pressure to the separator 13A in advance as illustrated in FIG. 9 like the insertion of the lithium ion source 16B provided on the inner peripheral surface of the outermost peripheral portion, and a lithium electrode current collector 26c is bonded under pressure to the lithium ion source 16A so as to be brought into close contact with the lithium ion source 16A bonded under pressure to the separator 13A as illustrated in FIG. 10, and wound, whereby the lithium ion source 16A can be electrically connected to the negative electrode 12 to form a short-circuit between both.

In the assembly step of the wound electrode unit 10, the insertion of the lithium ion source 16C arranged in the intra-positive electrode space 11S is preferably conducted by winding the lithium ion source 16C in a state bonded under pressure to the separator 13A in advance like the insertion of the lithium ion sources 16A and 16B respectively provided on the inner peripheral surface of the innermost peripheral portion and the inner peripheral surface of the outermost peripheral portion, and a lithium electrode current collector is bonded under pressure to the lithium ion source 16C so as to be brought into close contact with the lithium ion source 16C bonded under pressure to the separator 13A, and wound, whereby the lithium ion source 16C can be electrically connected to the negative electrode 12 to form a short-circuit between both.

In such a wound electrode unit 10, specifically, a first belt-like material with an intra-negative electrode space 12S, a negative electrode piece 121, an intra-negative electrode space 12S and a negative electrode piece 122 formed on a separator 13B in this order from one end to the other end, and a second belt-like material with a lithium ion source 16A which becomes an innermost peripheral surface of the wound electrode unit 10, a positive electrode piece 111, a lithium ion source 16C, a positive electrode piece 112 and a lithium ion source 16B which becomes an outermost peripheral surface of the wound electrode unit 10 formed on a separator 13A in this order from one end to the other end are first prepared. In these first and second belt-like materials, the lengths and arrangement positions of the spaces and electrode pieces of the positive electrode 11 and negative electrode 12 are set on the basis of the thicknesses of the respective component members in such a manner that the positive electrode piece is opposite to the negative electrode piece through only the separator when wound, the lithium ion source is also opposite to the negative electrode piece through only the separator, and the inner peripheral surface and outer peripheral surface become a state composed of the lithium ion source.

These first and second belt-like materials are stacked on each other, and the resultant electrode stack 10A is wound on a shaft from one end (one end of the lithium ion source 16A) thereof, whereby the wound electrode unit 10 is obtained.

The wound electrode unit 10 prepared in this manner is housed together with an aprotic organic solvent electrolyte solution in an outer container 20 and left to stand for a fixed period of time (for example, 10 days) in this state, whereby the negative electrode 12 is doped with lithium ions in advance because the lithium ion sources 16A to 16C are short-circuited to the negative electrode 12.

[Electrodes]

The positive electrode 11 and negative electrode 12 (hereinafter, both electrodes are also referred to as "electrodes") are each prepared by forming an electrode layer on at least one surface of a belt-like current collector, and both electrodes have substantially the same structure, and so the electrodes are described below with reference to the same drawings.

Figure 11:
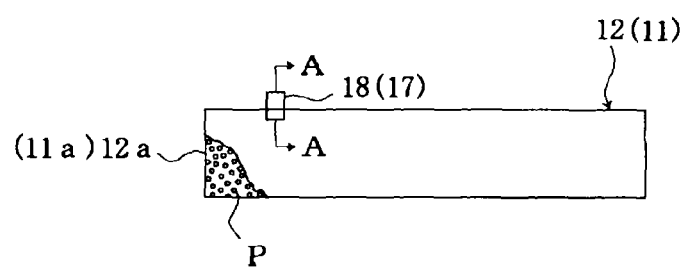
FIG. 11 is an explanatory plan view illustrating an electrode in the wound electrode unit in a developed state.
Figure 12:
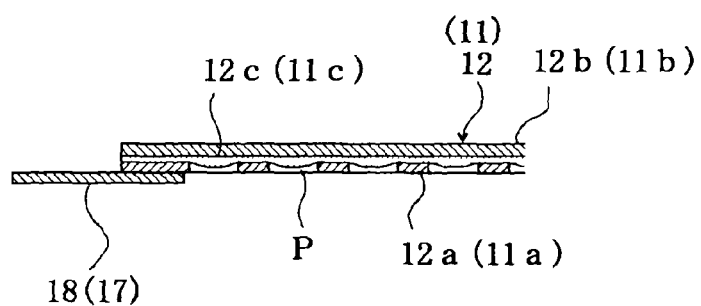
FIG. 12 is an explanatory view illustrating, on an enlarged scale, an A-A section of the electrode illustrated in FIG. 11.

FIG. 11 is an explanatory plan view illustrating an electrode in the wound electrode unit in a developed state, and FIG. 12 is an explanatory view illustrating, on an enlarged scale, an A-A section of the electrode illustrated in FIG. 11.

The negative electrode 12 (positive electrode 11) in this embodiment is prepared by forming an electrode layer 12b (11b) containing a negative electrode active material or positive electrode active material through a primer layer 12c (11c) on one surface of a belt-like negative electrode current collector 12a (positive electrode current collector 11a), and a negative electrode terminal 18 (positive electrode terminal 17) is fixed and connected to the other surface of the negative electrode current collector 12a (positive electrode current collector 11a) by, for example, stitching or cold welding.

When an electrode prepared by forming the electrode layer 12b or electrode layer 11b on both surfaces of the negative electrode current collector 12a or positive electrode current collector 11a is used as the electrode, the electrode layer 12b or electrode layer 11b is partially separated from the negative electrode current collector 12a or positive electrode current collector 11a, whereby the negative electrode terminal 18 or positive electrode terminal 17 can be connected to the negative electrode current collector 12a or positive electrode current collector 11a.

Here, the negative electrode terminal 18 and positive electrode terminal 17 may be drawn separately from both ends of the wound electrode unit 10 or from one end. The negative electrode terminal 18 and positive electrode terminal 17 may each be provided by one. However, plural terminals are preferably provided because an internal resistance is lowered.

The positive electrode current collector 11a and negative electrode current collector 12a (hereinafter, both electrode current collectors are also referred to as "electrode current collectors") are each composed of a porous material having pores P passing through from a front surface to a back surface. Examples of the form of such a porous material include expanded metal, punching metal, metal net, foam and porous foil having through-holes formed by etching.

The form of the pores P in the electrode current collector may be suitably set to any form such as a circle or a rectangle. The thickness of the electrode collector is preferably 20 to 50 μm from the viewpoints of strength and weight saving.

The porosity of the electrode current collector is generally 10 to 79%, preferably 20 to 60%. Here, the porosity is calculated out according to [1−(Mass of electrode current collector/True specific gravity of electrode current collector)/(Apparent volume of electrode current collector)]×100.

Various materials generally used in applications such as organic electrolyte batteries may be used as the material of the electrode current collectors. Specific examples of the material for the negative electrode current collector 12a include stainless steel, copper, nickel and the like, and examples of the material for the positive electrode current collector 11a include aluminum, stainless steel and the like.

Such a porous material used as the electrode current collector, lithium ions freely moves between the respective electrodes through the pores P in the electrode current collector from the lithium ion sources 16A to 16C even when the lithium ion sources 16A to 16C are respectively arranged on the inner peripheral surface, the outer peripheral surface in the wound electrode unit 10 and the intra-positive electrode space 11S, so that the negative electrode 12 and/or the positive electrode 11 can be doped with the lithium ions.

In the present invention, it is preferable that at least part of the pores P in the electrode current collector are closed with a conductive material hard to fall off, and the electrode layer 11b or 12b is formed on one surface of the electrode current collector in this state. Productivity of the electrodes can thereby be improved, and lowering of reliability of the accumulator, which is caused by falling-off of the electrode layer 11b or 12b from the electrode current collector, can be prevented or inhibited.

The thickness (total thickness of the electrode current collector and the electrode layer) of the electrode is made small, whereby a higher power density can be achieved.

The form and number of the pores P in the electrode current collector may be suitably set in such a manner that lithium ions in an electrolytic solution, which will be described subsequently, can move between front and back surfaces of the electrode without being interrupted by the current collector, and the pores are easily closed by the conductive material.

The electrode layer 12b in the negative electrode 12 contains a negative electrode active material capable of reversibly supporting lithium ions.

As the negative electrode active material making up the electrode layer 12b, may be suitably used, for example, graphite, non-graphitizing carbon or a polyacenic organic semiconductor (hereinafter referred to as "PAS") which is a heat-treated aromatic condensed polymer having a polyacenic skeleton structure with an atomic ratio (hereinafter described as "H/C") of hydrogen atoms/carbon atoms of 0.50 to 0.05. Among these materials, PAS is more preferred in that a high capacity is obtained. For example, when discharging is conducted after 400 mAh/g of lithium ions are supported (charged) on PAS having H/C of about 0.2, an capacitance of 650 F/g or more is obtained. Alternatively, when 500 mAh/g or more of lithium ions are supported (charged), an capacitance of 750 F/g or more is obtained. From this fact, it is understood that PAS has a very great capacitance.

When that having an amorphous structure, such as PAS, is used as the negative electrode active material in the present invention, the potential is lowered as the amount of lithium ions to be supported is increased, so that withstand voltage (charging voltage) in the resulting accumulator becomes high, and the rate (slope of a discharge curve) of rise in the voltage upon discharging becomes low. Therefore, the amount of lithium ions is preferably suitably set within a range of lithium ion occluding capacity in the active material according to a working voltage required of the accumulator.

PAS does not cause structural change such as swelling or contraction upon insertion or extraction of lithium ions because it has the amorphous structure, so that PAS is excellent in cycle characteristics. In addition, PAS has an isotropic molecular structure (higher-order structure) upon insertion or extraction of lithium ions, so that it exhibits excellent characteristics even upon quick charge or discharge. Thus, PAS is suitable for use as the negative electrode active material.

An aromatic condensed polymer that is a precursor of PAS is a condensate of an aromatic hydrocarbon compound and an aldehyde. As the aromatic hydrocarbon compound, may be suitably used, for example, a phenolic compound such as phenol, cresol or xylenol. Examples thereof include methylenebisphenols represented by the following formula, hydroxybiphenyls and hydroxynaphthalenes. Among these, phenols, particularly, phenol is practically preferred.

[Chem. 1]

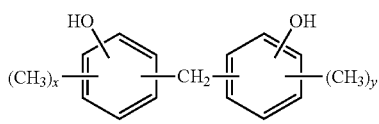

(In the formula, x and y are, independently of each other, an integer of 0 to 2.)

As the aromatic condensed polymer, may also be used a denatured aromatic condensed polymer obtained by substituting a part of the aromatic hydrocarbon compound having the phenolic hydroxyl group by an aromatic hydrocarbon compound having no phenolic hydroxyl group, for example, xylene, toluene or aniline, for example, a condensate of phenol, xylene and formaldehyde. Further, a denatured aromatic condensed polymer substituted by melamine or urea may be used, and a furan resin is also preferred.

PAS is used as an insoluble and infusible substrate, and the insoluble and infusible substrate may also be produced from the aromatic condensed polymer in the following manner. More specifically, the aromatic condensed polymer is gradually heated to a temperature of 400 to 800° C. under a non-oxidizable atmosphere (also including vacuum), whereby an insoluble and infusible substrate having H/C of 0.5 to 0.05, preferably 0.35 to 0.10 can be obtained.

However, the production process of the insoluble and infusible substrate is not limited thereto. For example, an insoluble and infusible substrate having H/C within the above-described range and a specific surface area of 600 $m^2/g$ or more as measured by the BET method can also be obtained according to the process described in Japanese Patent Publication No. 3-24024 or the like.

In the insoluble and infusible substrate, the position of a main peak is present at 24° or lower in terms of $2\theta$ as determined by X-ray diffraction (CuK $\alpha$), and another broad peak than the main peak is also present between 41° and 46°. In short, the insoluble and infusible substrate has a polyacenic skeleton structure with an aromatic polycyclic structure moderately developed, also has an amorphous structure and can be stably doped with lithium ions, so that this substrate is suitable for use as a negative electrode active material for lithium ion batteries.

In the present invention, the negative electrode active material preferably has a pore diameter of 3 nm or more and a pore volume of 0.10 mL/g or more, and the upper limit of the pore diameter is generally within a range of from 3 to 50 nm though not limited thereto. The range of the pore volume is also not particularly limited. However, the range is generally from 0.10 to 0.5 mL/g, preferably from 0.15 to 0.5 mL/g.

In the wound-type LIC according to the present invention, the electrode layer 12b in the negative electrode 12 is formed on the negative electrode current collector 12a with a material containing the above-described negative electrode active material such as the carbonaceous material or PAS. However, a forming process thereof is not specified, and any publicly known process may be utilized. Specifically, a slurry with negative electrode active material powder, a binder and optional conductive powder dispersed in an aqueous medium or organic solvent is prepared, and this slurry is applied to the surface of the negative electrode current collector 12a and dried, or the slurry is formed into a sheet in advance, and the resultant formed product is stuck on the surface of the negative electrode current collector 12a, whereby the electrode layer 12b can be formed.

Here, examples of the binder used in the preparation of the slurry include rubber binders such as SBR, fluorine-containing resins such as polyethylene tetrafluoride and polyvinylidene fluoride, and thermoplastic resins such as polypropylene and polyethylene. Among these, the fluorine-containing resins are preferred as the binder, and a fluorine-containing resin having an atomic ratio (hereinafter described as "F/C") of fluorine atoms/carbon atoms of not less than 0.75 and less than 1.5 is particularly preferably used, with a fluorine-containing resin having F/C of not less than 0.75 and less than 1.3 being further preferred.

The amount of the binder used is 1 to 20% by mass, preferably 2 to 10% by mass based on the negative electrode active material though it varies according to the kind of the negative electrode active material and the form of the resulting electrode.

Examples of the conductive material optionally used include acetylene black, graphite, metal powder and the like. The amount of the conductive material used is preferably 2 to 40% by mass in terms of a proportion based on the negative electrode active material though it varies according to the electric conductivity of the negative electrode active material and the form of the resulting electrode.

When the electrode layer 12b is formed by applying the slurry to the negative electrode current collector 12a, a primer layer 12c of a conductive material is preferably formed on a surface of the negative electrode current collector 12a to be coated as illustrated in FIG. 12. If the slurry is directly applied to the surface of the negative electrode current collector 12a, the slurry may be leaked out of the pores P in the negative electrode current collector 12a because the negative electrode current collector 12a is a porous material, or it may be difficult in some cases to form an electrode layer 12b having a uniform thickness because the surface of the negative electrode current collector 12a is irregular. The primer layer 12c is formed on the surface of the negative electrode current collector 12a, whereby the pores P are closed by the primer layer 12c, and a smooth coated surface is formed, so that the slurry is easily applied, and an electrode layer 12b having a uniform thickness can be formed.

In the illustrated embodiment, the electrode layer 12b is formed on only one surface of the negative electrode current collector 12a. However, when the electrode layer 12b is formed on both surfaces of the negative electrode current collector 12a, for example, the slurry is intermittently applied on any one of both surfaces of the negative electrode current collector 12a to form an uncoated region on the negative electrode current collector 12a, whereby a negative electrode terminal can be connected to the uncoated region.

The thickness of the electrode layer 12b in the negative electrode 12 is designed with it balanced with the thickness of the electrode layer 11b in the positive electrode 11 in such a manner that a sufficient energy density is surely given to the resulting wound-type LIC. However, when the electrode layer is formed on one surface of the negative electrode current collector 12a, the thickness is generally 15 to 100 µm, preferably 20 to 80 µm from the viewpoints of the power density and energy density of the resulting wound-type LIC and industrial productivity.

The electrode layer 11b in the positive electrode 11 contains a positive electrode active material capable of reversibly supporting lithium ions and/or anions, for example, tetrafluoroborate anions.

As the positive electrode active material making up the electrode layer 11b, may be suitably used, for example, active carbon, a conductive polymer or PAS which is a heat-treated aromatic condensed polymer having a polyacenic skeleton structure with H/C of 0.05 to 0.50.

The electrode layer 11b in the positive electrode 11 can be formed according to the same process as in the electrode layer 12b in the negative electrode 12.

In the wound-type LIC according to the present invention, potentials of the positive electrode 11 and the negative electrode 12 after the positive electrode 11 and the negative electrode 12 are short-circuited preferably become 2.0 V or lower.

In the conventional electric double layer capacitor, substantially the same amount of the same kind of material (mainly, active carbon) is used as the active material in positive and negative electrodes. This active material has a potential of about 3 V upon assembly of the capacitor. When the capacitor is charged, anions form an electric double layer on the surface of the positive electrode, thereby raising the potential of the positive electrode, and cations form an electric double layer on the surface of the negative electrode, thereby lowering the potential of the negative electrode. When the capacitor is discharged to the contrary, anions and cations are discharged into an electrolytic solution from the positive electrode and the negative electrode, respectively, whereby the potentials of the electrodes are lowered and raised, respectively, and finally the potentials become about 3 V. As described above, the ordinary carbonaceous material has a potential of about 3 V, so that in an organic electrolyte capacitor using the carbonaceous material in both positive electrode and negative electrode, the potentials of the positive electrode and the negative electrode after the positive electrode and the negative electrode are short-circuited each become about 3 V.

On the other hand, in the wound-type LIC according to the present invention, the potential of the positive electrode after the positive electrode and the negative electrode are short-circuited preferably becomes 2.0 V (Li/Li$^+$; the same shall apply hereinafter) or lower as described above. In other words, in the wound-type LIC according to the present invention, it is preferable that an active material capable of reversibly supporting lithium ions and/or anions is used as the positive electrode active material, an active material capable of reversibly supporting lithium ions is used as the negative electrode active material, and lithium ions are supported in the negative electrode 12 and/or the positive electrode 11 in advance in such a manner that the potentials of the positive electrode and the negative electrode after the positive electrode 11 and the negative electrode 12 are short-circuited each become 2.0 V or lower.

Incidentally, the fact that the potential of the positive electrode after the positive electrode and the negative electrode are short-circuited is 2.0 V or lower in the present invention means that the potential of the positive electrode determined by any one of the following methods (A) and (B) becomes 2.0 V or lower.

(A) A potential of the positive electrode as determined by directly connecting a positive electrode terminal to a negative electrode terminal through a conductor after doped with lithium ions, keeping this state for 12 hours or longer, and then releasing the short circuit to conduct measurement within 0.5 to 1.5 hours.

(B) A potential of the positive electrode as determined by connecting a positive electrode terminal to a negative electrode terminal through a conductor after conducting constant-current discharge to 0 V over 12 hours or longer by a charge/discharge tester, keeping this state for 12 hours or longer, and then releasing the short circuit to conduct measurement within 0.5 to 1.5 hours.

The fact that the potential of the positive electrode after the positive electrode and the negative electrode are short-circuited becomes 2.0 V or lower in the present invention is not limited to right after doped with the lithium ions and means that the potential of the positive electrode after short circuit becomes 2.0 V or lower in any state of a charged state, a discharged state, and a short-circuited state after charge/discharge is conducted repeatedly.

The fact that the potential of the positive electrode after the positive electrode and the negative electrode are short-circuited becomes 2.0 V or lower in the present invention will be described in more detail.

The active carbon or carbonaceous material generally has a potential of about 3 V (Li/Li$^+$) as described above, and the potentials of both positive electrode and negative electrode become about 3 V when a capacitor is fabricated by using the active carbon as an active material for both electrodes, so that the potential of the positive electrode remains unchanged and is about 3 V even when the positive electrode and the negative electrode are short-circuited. The same applies to a case of the so-called hybrid capacitor using the active carbon as a positive electrode active material and using a carbonaceous material such as graphite or non-graphitizing carbon used in the lithium ion secondary battery as a negative electrode active material, and both potentials become about 3 V, so that the potential of the positive electrode remains unchanged and is about 3 V even when the positive electrode and the negative electrode are short-circuited. Accordingly, the potential of the negative electrode changes to about 0 V when charged though it varies according to mass balance between the positive electrode and the negative electrode, so that a charging voltage can be made high, and so a capacitor having a high voltage and a high energy density can be obtained. Since the upper limit of the charging voltage is generally set to a voltage that does not cause decomposition of an electrolytic solution by rise in the potential of the positive electrode, the charging voltage can be raised by the value of the potential of the negative electrode lowered when the upper limit is set to the potential of the positive electrode.

However, in the above-described hybrid capacitor that the potential of the positive electrode becomes about 3 V upon short-circuiting, the potential of the positive electrode upon discharging is up to 3.0 V when the upper limit potential of the positive electrode is set to, for example, 4.0 V, and a potential change in the positive electrode is about 1.0 V to fail to sufficiently utilize the capacity of the positive electrode. In addition, it is known that when lithium ions are inserted (charged) in the negative electrode and extracted (discharged), initial charge/discharge efficiency often becomes low, and lithium ions which cannot be extracted upon discharging are present. This is described as being due to the fact that the lithium ions are consumed in decomposition of the electrolytic solution on the surface of the negative electrode or trapped in structural defects in the carbonaceous material. In this case, the charge/discharge efficiency of the negative electrode becomes low compared with the charge/discharge efficiency of the positive electrode, and the potential of the positive electrode becomes higher than 3 V when the positive electrode and the negative electrode are short-circuited after charge/discharge is conducted repeatedly, and so the working capacity is more lowered. In other words, the positive electrode is allowed to discharge up to 2.0 V from 4.0 V, while discharging can be conducted only to 3.0 V from 4.0 V, or only a half of the available capacity is utilized, so that it is difficult to achieve a high capacity though a high voltage can be obtained.

Accordingly, it is necessary to improve the available capacity of the positive electrode in order to not only achieve a high voltage and a high energy density, but also achieve a high capacity and a high energy density.

When the potential of the positive electrode after the short-circuit between the positive electrode and the negative electrode is lower than 3.0 V, the available capacity comes to be increased much more to achieve a high capacity. In order to lower the potential of the positive electrode after the short-circuit between the positive electrode and the negative electrode to 2.0 V or lower, it is preferable to separately charge lithium ions to the negative electrode from a lithium ion source such as lithium metal in addition to the amount charged by charge/discharge of the capacitor. The lithium ions are supplied from other than the positive electrode and the negative electrode, whereby the positive electrode, the negative electrode and lithium metal become an equilibrium potential when the positive electrode and the negative electrode are short-circuited, so that the potentials of both positive electrode and negative electrode become 3.0 V or lower. The equilibrium potential becomes low as the amount of the lithium metal making up the lithium ion source increases. When the negative electrode active material and the positive electrode active material are changed, the equilibrium potential is also changed, so that it is necessary to adjust the amount of the lithium ions supported in the negative electrode taking the properties of the negative electrode active material and the positive electrode active material into consideration in such a manner that the potential of the positive electrode after the short-circuit between the positive electrode and the negative electrode becomes 2.0 V or lower.

The fact that in the wound-type LIC according to the present invention, the potential of the positive electrode 11 after the positive electrode 11 and the negative electrode 12 are short-circuited becomes 2.0 V or lower means that lithium ions are supplied to the positive electrode 11 and/or the negative electrode 12 from other than the positive electrode 11 and the negative electrode 12 in the wound-type LIC as described above. The lithium ions may be supplied to one or both of the negative electrode 12 and the positive electrode 11. When for example, active carbon is used as a positive electrode active material, however, the amount of lithium ions supported increases, and the lithium ions are irreversibly consumed when the potential of the positive electrode becomes low, so that such inconvenience that the capacity of the capacitor is lowered may occur in some cases. It is thus necessary to control the amount of the lithium ions supplied to the negative electrode and the positive electrode so as not to cause the inconvenience. In any event, the lithium ions supplied to the positive electrode and/or the negative electrode in advance are supplied to the negative electrode by charging the cell, so that the potential of the negative electrode is lowered.

When the potential of the positive electrode 11 after the positive electrode 11 and the negative electrode 12 are short-circuited is higher than 2.0 V, the energy density of the resulting wound-type LIC is small because the amount of lithium ions supplied to the positive electrode 11 and/or the negative electrode 12 is small. The potential of the positive electrode after the positive electrode and the negative electrode are short-circuited becomes low as the amount of the lithium ions supplied increases, and the energy density is improved. The potential of the positive electrode is preferably 2.0 V or lower for achieving a high energy density, and 1.0 V (Li/Li$^+$) or lower is more preferred for achieve a higher energy density. In other words, the fact that the potential of the positive electrode after the positive electrode 11 and the negative electrode 12 are short-circuited becomes low means that the amount of lithium ions supplied to the negative electrode 12 by being charged in the wound-type LIC increases, so that the capacitance of the negative electrode 12 increases, and a potential change quantity in the negative electrode 12 becomes small. As a result, a potential change quantity in the positive electrode 11 becomes large, and the capacitance and capacity of the wound-type LIC become large to achieve a high energy density.

If the potential of the positive electrode 11 becomes lower than 0.1 V, inconvenience such as generation of gasses or irreversible consumption of lithium ions occurs depending on the positive electrode active material used, so that it is difficult to measure the potential of the positive electrode 11. If the potential of the positive electrode 11 becomes too low, it means that the mass of the negative electrode active material is excessive, and the energy density is lowered to the contrary. Accordingly, the potential of the positive electrode 11 is generally 0.1 V or higher, preferably 0.3 V or higher.

Incidentally, the capacitance and capacity in the present invention are defined in the following manner. The capacitance of the capacitor designates a slope of a discharge curve of the capacitor, and the unit is F (farad). The capacitance per unit mass of the capacitor designates a value obtained by dividing the capacitance of the capacitor by the total mass of the mass of the positive electrode active material and the mass of the negative electrode active material, and the unit is F/g. The capacitance of the positive electrode designates a slope of a discharge curve of the positive electrode, and the unit is F. The capacitance per unit mass of the positive electrode designates a value obtained by dividing the capacitance of the positive electrode by the mass of the positive electrode active material, and the unit is F/g. The capacitance of the negative electrode designates a slope of a discharge curve of the negative electrode, and the unit is F. The capacitance per unit mass of the negative electrode designates a value obtained by dividing the capacitance of the negative electrode by the mass of the negative electrode active material, and the unit is F/g.

The capacity of the capacitor designates a difference between a discharge start voltage and a discharge end voltage in the capacitor, i.e., a product of a voltage change quantity and the capacitance of the capacitor, and the unit is C (coulomb). Since 1 C is a charge quantity when a current of 1 A has flowed for 1 second, the capacity is indicated in terms of mAh in the present specification. The capacity of the positive electrode is a product of a difference (positive electrode potential change quantity) between the potential of the positive electrode upon starting of discharge and the potential of the positive electrode upon ending of discharge and the capacitance of the positive electrode, and the unit is C or mAh. The capacity of the negative electrode is a product of a difference (negative electrode potential change quantity) between the potential of the negative electrode upon starting of discharge and the potential of the negative electrode upon ending of discharge and the capacitance of the negative electrode, and the unit is C or mAh. The capacity of the capacitor consists with the capacity of the positive electrode and the capacity of the negative electrode.

In the wound-type LIC according to the present invention, it is preferable that the capacitance per unit mass of the negative electrode active material is at least three times as much as the capacitance per unit mass of the positive electrode active material, and the mass of the positive electrode active material is heavier than the mass of the negative electrode active material. For example, the amount (predoping amount) of lithium ions charged in the negative electrode is suitably controlled in view of the capacitance of the positive electrode, whereby the capacitance per unit mass of the negative electrode active material can be controlled to at least three times as much as the capacitance per unit mass of the positive electrode active material, and the mass of the positive electrode active material can be made heavier than the mass of the negative electrode active material. A capacitor higher in voltage and capacity than the conventional electric double layer capacitor can be thereby obtained.

In addition, when the negative electrode active material having an capacitance per mass unit larger than the capacitance per unit mass of the positive electrode active material is used, the mass of the negative electrode active material can be reduced without changing the potential change quantity of the negative electrode, so that the amount of the positive electrode active material charged becomes large, and the capacitance and capacity of the wound-type LIC can be made large.

The mass of the positive electrode active material is preferably heavier than the mass of the negative electrode active material and is more preferably 1.1 to 10 times as much as the mass of the negative electrode active material.

If the mass of the positive electrode active material is less than 1.1 times as much as the mass of the negative electrode active material, a capacity difference becomes small. Thus, such a mass is not preferable. If the mass of the positive electrode active material exceeds 10 times as much as the mass of the negative electrode active material on the other hand, the capacity may become small by contraries, and a thickness difference between the positive electrode 11 and the negative electrode 12 becomes too large. Thus, such a mass is not preferable from the viewpoint of the structure of the wound-type LIC.

[Separator]

A porous material resisting the electrolytic solution, positive electrode active material or negative electrode active material and having interconnected pores and low electro-conductivity, or the like may be used as the separators 13A and 13B.

As materials for the separators 13A and 13B, may be used cellulose (paper), polyethylene, polypropylene and other publicly known materials. Among these, cellulose (paper) is preferred from the viewpoints of durability and profitability.

No particular limitation is imposed on the thickness of the separators 13A and 13B. However, the thickness is preferably generally about 20 to 50 μm.

[Lithium Ion Source]

The lithium ion sources 16A to 16C are preferably bonded under pressure to or stacked on a metallic lithium electrode current collector. In such a structure, a lithium electrode terminal is provided on the lithium electrode current collector, whereby such a lithium ion source can be electrically connected to, for example, the negative electrode terminal 18 through the lithium electrode terminal.

As the lithium electrode current collector, that having a porous structure like the electrode current collector is preferably used in such a manner that lithium metal making up the lithium ion sources 16A to 16C is easily bonded under pressure thereto, and lithium ions pass through as needed. In addition, the material for the lithium electrode current collector used is preferably that reacting with no lithium ion source, such as stainless steel.

When a conductive porous material such as stainless steel mesh is used as the lithium electrode current collector, at least part of lithium metal making up the lithium ion sources 16A to 16C, particularly, at least 80% by mass is preferably embedded in pores in the lithium electrode current collector, whereby spaces produced between electrodes by loss of lithium metal lessen even after lithium ions are supported in the negative electrode 12, and reliability of the resulting wound-type LIC can be more surely retained.

The thickness of the lithium electrode current collector is preferably about 10 to 200 μm.

The thickness of the lithium metal bonded under pressure to the lithium electrode current collector is suitably determined in view of the amount of lithium ions supported in the negative electrode 12 in advance and is preferably generally about 50 to 300 μm.

The amount of the lithium metal making up the lithium ion sources 16A to 16C is preferably set to an amount of lithium ions to dope in such a manner that the potential of positive electrode 11 after the positive electrode 11 and the negative electrode 12 are short-circuited becomes 2.0 V or lower. In addition, the amount of the lithium metal is preferably distributed to an amount of lithium metal making up the lithium ion source 16A provided on the inner peripheral surface, an amount of lithium metal making up the lithium ion source 16C provided in the intra-electrode space, and an amount of lithium metal making up the lithium ion source 16B provided on the outer peripheral surface in such a manner that, for example, the negative electrode 12 is doped with lithium ions from both sides of the outer peripheral surface and the inner peripheral surface in the wound electrode unit 10 as quickly and uniformly as possible.

No particular limitation is imposed on the material of the negative electrode terminal 18 and the positive electrode terminal 17 so far as it is conductive, and various materials may be used. However, that of the same kind as the material of the negative electrode current collector 12a and the positive electrode current collector 11a is preferred from the viewpoints of connectability and expansibility.

No particular limitation is imposed on the material of the tapes 25 so far as it resists the electrolytic solution and has no adverse influence on the resulting wound-type LIC. However, the same material as the material of the separators 13A and 13B is preferred.

The tapes 25 preferably have a thickness of about 50 to 100 μm and a width of about 5 to 10 mm because the wound electrode unit 10 can be stably fixed, and workability is also improved.

The number of tapes 25 and positions fixed by the tapes 25 are suitably determined mostly according to the dimensions of the wound electrode unit 10. However, when the number of tapes 25 is 2 or 3, the wound electrode unit 10 can be stably fixed.

No particular limitation is imposed on the material of the outer container 20, and various materials generally used in batteries or capacitors may be used. As examples of materials used, may be mentioned metallic materials such as iron and aluminum, plastic materials and composite materials obtained by laminating them. However, a film-type container making use of a laminate film formed of aluminum and a polymeric material such as nylon, polypropylene is preferred as the outer container 20 from the viewpoints of miniaturization and weight saving of the wound-type LIC.

No particular limitation is also imposed on the form of the outer container 20, and the form may be suitably selected from a cylindrical form, a rectangular form and the like according to uses of the resulting wound-type LIC. However, the cylindrical form is preferred when a columnar wound electrode unit is housed, and the rectangular form is preferred when a flattened columnar wound electrode unit is housed.

As the electrolytic solution filled into the outer container 20, is used an aprotic organic solvent electrolyte solution of a lithium salt.

No limitation is imposed on the lithium salt making up the electrolyte so far as it can transfer lithium ions, does not undergo electrolysis even under a high voltage and can cause lithium ions to stably exist therein, and specific examples thereof include $LiClO_4$, $LiAsF_6$, $LiBF_4$, $LiPF_6$ and $Li(C_2F_5SO_2)_2N$.

Specific examples of the aprotic organic solvent include ethylene carbonate, propylene carbonate, dimethyl carbonate, diethylene carbonate, γ-butyrolactone, acetonitrile, dimethoxyethane, tetrahydrofuran, dioxolane, methylene chloride and sulfolane. These aprotic organic solvents may be used either singly or in any combination thereof.

The electrolytic solution is prepared by mixing the electrolyte with the solvent in a fully dehydrated state, and the concentration of the electrolyte in the electrolytic solution is preferably at least 0.1 mol/L, more preferably 0.5 to 1.5 mol/L.

According to such a wound-type accumulator as described above, the wound electrode unit 10 is configured by winding the electrode stack 10A with the lithium ion source 16C arranged in the intra-positive electrode space 11S, so that the wound electrode unit 10 can be simply assembled, and thus the assembly can be completed in a short period of time, and the predoping time can be shortened because the lithium ion source 16C is arranged in the intra-positive electrode space 11S. As a result, high productivity is achieved.

According to the wound-type accumulator produced in this manner, the internal resistance thereof is reduced, and both high performance and high durability are achieved even when the assembly is completed in a short period of time because speeding-up and evenness of predoping are made.

Although the first embodiment of the present invention has been described above, various changes or modifications may be added to this first embodiment.

Figure 13:
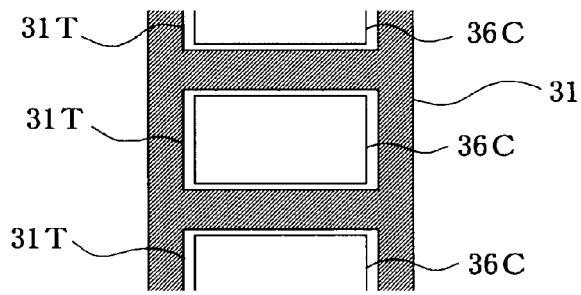
FIG. 13 is an explanatory plan view typically illustrating another exemplary structure of the positive electrode.

For example, the positive electrode may be formed so as to have intra-positive electrode spaces composed of a plurality of slits 31T as illustrated in FIG. 13. In such a positive electrode 31, lithium ion sources 36C provided in the intra-positive electrode spaces are arranged in the slits 31T in a state coming into no contact with the positive electrode 31, and the positive electrode is wound together with the negative electrode, thereby configuring the wound electrode unit.

Figure 14:
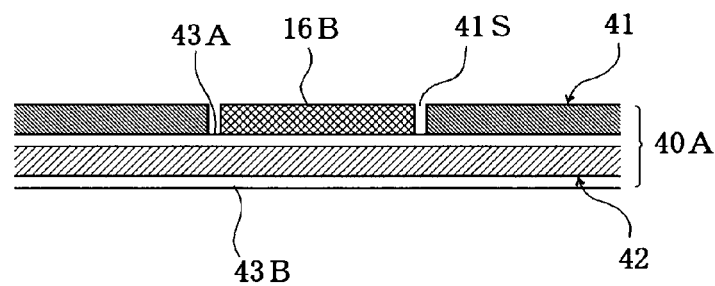
FIG. 14 is an explanatory cross-sectional view typically illustrating a modified example of the electrode stack in the first embodiment.
Figure 15:
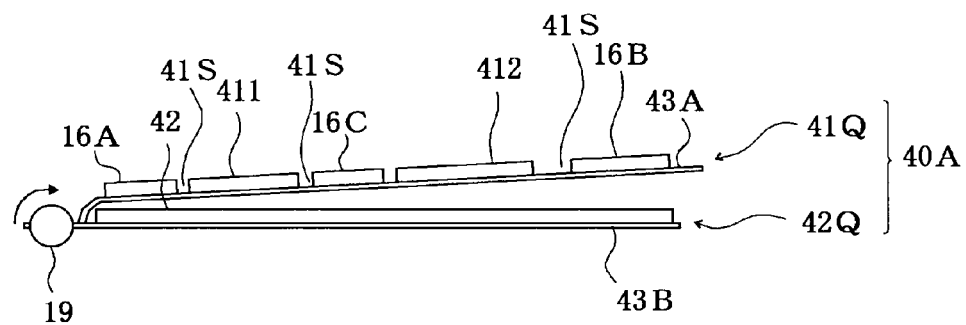
FIG. 15 is an explanatory cross-sectional view typically illustrating a method for obtaining a wound electrode unit from the electrode stack in FIG. 14.

For example, the negative electrode is not limited to the negative electrode made up of the plurality of negative electrode pieces, and a negative electrode 42 having no intra-negative electrode space may be used as illustrated in FIGS. 14 and 15.

In such a wound electrode unit, as illustrated in FIG. 15, a first belt-like material 42Q with a belt-like negative electrode 42 arranged on a separator 43B, and a second belt-like material 41Q with an intra-positive electrode space 41S, in which a lithium ion source 16A which becomes an inner peripheral surface of the wound electrode unit has been arranged, a positive electrode piece 411, an intra-positive electrode space 41S, in which a lithium ion source 16C has been arranged, a positive electrode piece 412, and an intra-positive electrode space 41S, in which a lithium ion source 16B which becomes an outermost peripheral surface of the wound electrode unit has been arranged, formed on a separator 43A in this order from one end to the other end are first prepared. In the first belt-like material 42Q and second belt-like material 41Q, the lengths and arrangement positions of the intra-positive electrode spaces and electrode pieces are set on the basis of the thicknesses of the respective component members in such a manner that the positive electrode piece is opposite to the negative electrode through only the separator when wound, the lithium ion source is also opposite to the negative electrode through only the separator, and the inner peripheral surface and outer peripheral surface become a state composed of the lithium ion source.

The first belt-like material 42Q and second belt-like material 41Q are stacked on each other, and the resultant electrode stack 40A is wound on a shaft 19 from one end (one end of the lithium ion source 16A) thereof in a direction of an arrow in the drawing, whereby the wound electrode unit is obtained.

As the material of the shaft 19, may be used a metallic material such as stainless steel, copper or nickel, or a resin having high resistance to electrolyte, such as polypropylene or polyphenylenesulfide.

The diameter of the shaft 19 may be suitably set according to the inner periphery of the wound electrode unit 10. The shaft 19 is used in the preparation process of the wound electrode unit 10 and may be left in the wound electrode unit 10 completed as it is or may be drawn out of the wound electrode unit so as not have the shaft.

For example, the wound electrode unit is not limited to the substantially columnar form and may be in the form of, for example, a flattened columnar form formed by winding the electrode stack into a plate form.

Second Embodiment

Figure 16:
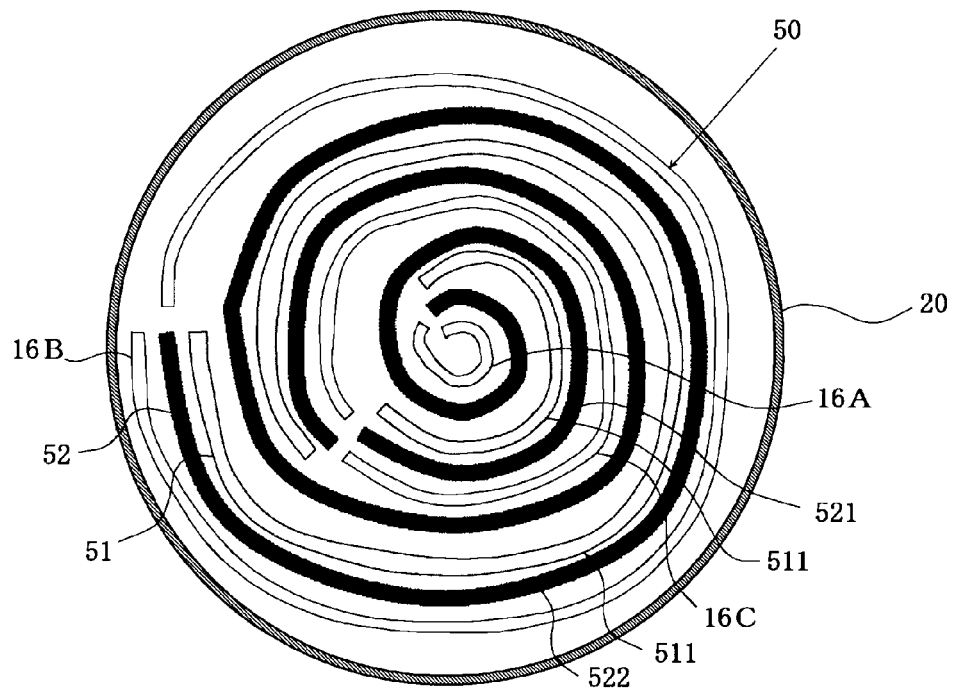
FIG. 16 is an explanatory cross-sectional view typically illustrating the construction of a wound-type lithium ion capacitor according to a second embodiment of the present invention.
Figure 17:
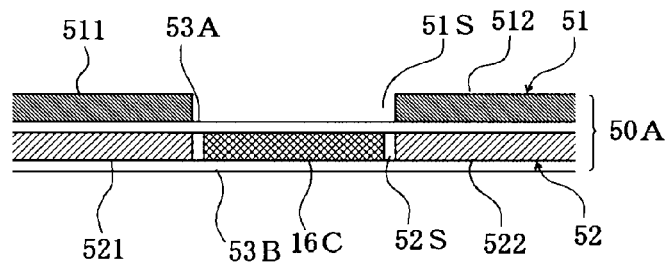
FIG. 17 is an explanatory cross-sectional view typically illustrating a sectional state of an electrode stack configured by releasing the wound state of a wound electrode unit of the wound-type LIC in FIG. 16.

The wound-type LIC according to a second embodiment has the same construction as in the first embodiment except that a wound electrode unit 50 has a cylindrical form configured by winding a belt-like positive electrode 51 having intra-positive electrode spaces 51S and a belt-like negative electrode 52 having intra-negative electrode spaces 52S through a separator, specifically, winding an electrode stack 50A obtained by stacking the negative electrode 52, a separator 53A and the positive electrode 51 in this order on a separator 53B from one end portion thereof as illustrated in FIGS. 16 and 17. Incidentally, the same characters in FIGS. 16 and 17 as the characters in the first embodiment indicate the same component members.

In the wound electrode unit 50 obtained by stacking such positive electrode 51, negative electrode 52 and lithium ion sources 16A to 16C on the separators 53A and 53B and winding the resultant stack, the negative electrode 52 is preferably superimposed on at least a part of the positive electrode 51.

Specifically, the wound electrode unit 50 is preferably configured by covering an outer peripheral surface of a pair of electrode portions composed of a positive electrode portion and a negative electrode portion, which oppose to each other, with a negative electrode portion extended from the negative electrode portion of the pair of electrode portions, covering an outer peripheral surface of the wound body covered with the extended negative electrode portion with the lithium ion source 16C and further covering the outer peripheral surface in this covered state with another pair of electrode portions.

The wound electrode unit is further preferably configured by covering a wound body of the lithium ion source 16A provided on the inner peripheral surface of the innermost peripheral portion with a negative electrode piece 521 and then inserting and winding a positive electrode piece 511.

High durability is given to the wound-type LIC by virtue of such a construction. Incidentally, if the lithium ion source is opposed to the positive electrode without interposing the negative electrode between them, predoping becomes insufficient, resulting in remaining of lithium metal, and arborescent lithium metal called dendrite deposits on the lithium electrode current collector according to conditions for charge/discharge when the lithium ion source is laminated for use on the lithium electrode current collector, which may form the cause of short circuit in some cases.

Figure 18:
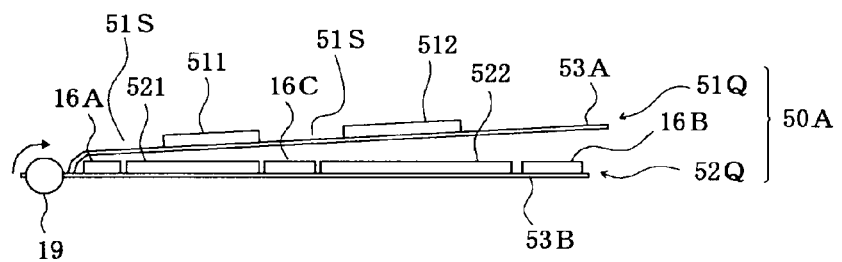
FIG. 18 is an explanatory cross-sectional view typically illustrating a method for obtaining the wound electrode unit of the wound-type LIC in FIG. 16.

In such a wound electrode unit 50, as illustrated in FIG. 18, a first belt-like material 52Q with a lithium ion source 16A which becomes an innermost peripheral surface of the wound electrode unit 50, a negative electrode piece 521, a lithium ion source 16C, a negative electrode piece 522 and a lithium ion source 16B which becomes an outermost peripheral surface of the wound electrode unit 50 formed on a separator 53B in this order from one end to the other end, and a second belt-like material 51Q with an intra-positive electrode space 51S, a positive electrode piece 511, an intra-positive electrode space 51S and a positive electrode piece 512 formed on a separator 53A in this order from one end to the other end are first prepared. In these first belt-like material 52Q and second belt-like material 51Q, the lengths and arrangement positions of the spaces and electrode pieces of the positive electrode 51 and negative electrode 52 are set on the basis of the thicknesses of the respective component members in such a manner that the positive electrode piece is opposite to the negative electrode piece through only the separator when wound, the lithium ion source is also opposite to the negative electrode piece through only the separator, and the inner peripheral surface and outer peripheral surface become a state composed of the lithium ion source.

These first belt-like material 52Q and second belt-like material 51Q are stacked on each other, and the resultant electrode stack 50A is wound on a shaft 19 from one end (one end of the lithium ion source 16A) thereof in a direction of an arrow in the drawing, whereby the wound electrode unit 50 is obtained.

In the wound-type LIC according to the second embodiment, as the positive electrode 51, negative electrode 52, separators 53A and 53B and lithium ion sources 16A to 16C, may be fundamentally used those of the same constructions as the positive electrode 11, negative electrode 12, separators 13A and 13B and lithium ion sources 16A to 16C in the first embodiment, and a lithium electrode current collector is preferably bonded under pressure to or stuck on the lithium ion sources 16A to 16C like the wound-type LIC according to the first embodiment.

According to such a wound-type LIC having such a wound electrode unit 50 as described above, the same effects as in the wound-type LIC according to the first embodiment can be achieved.

Although the second embodiment of the present invention has been described above, various changes or modifications may be added to this second embodiment.

Figure 19:
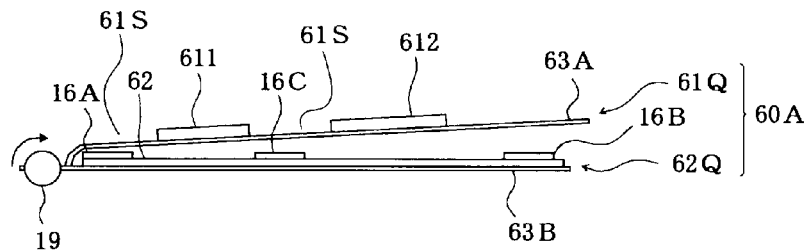
FIG. 19 is an explanatory cross-sectional view typically illustrating a method for obtaining a wound-type lithium ion capacitor according to a further construction.

For example, the negative electrode in the wound electrode unit is not limited to the negative electrode made up of the plurality of negative electrode pieces and formed by arranging the lithium ion sources in the spaces between them, and a negative electrode 62 having no intra-negative electrode space may be used as illustrated in FIG. 19, and the lithium ion sources 16A to 16C may be arranged at positions opposite to intra-positive electrode spaces 61S. Incidentally, the same characters in FIG. 19 as the characters in the first embodiment indicate the same component members.

In such a wound electrode unit, a second belt-like material 61Q with an intra-positive electrode space 61S, a positive electrode piece 611, an intra-positive electrode space 61S and a positive electrode piece 612 formed on a separator 63A in this order from one end to the other end, and a first belt-like material 62Q with a belt-like negative electrode 62 arranged on a separator 63B, and with a lithium ion source 16A, which becomes an inner peripheral surface of the wound electrode unit, a lithium ion source 16C, and a lithium ion source 16B, which becomes an outermost peripheral surface of the wound electrode unit, arranged on the negative electrode 62 at positions opposite to the respective intra-positive electrode spaces in a state entirely not opposed to the positive electrode pieces 611 and 612 are first prepared. In these first belt-like material 62Q and second belt-like material 61Q, the lengths and arrangement positions of the intra-positive electrode spaces and electrode pieces are set on the basis of the thicknesses of the respective component members in such a manner that the positive electrode piece is opposite to the negative electrode piece through only the separator when wound, the lithium ion source is also opposite to the negative electrode piece through only the separator, and the inner peripheral surface and outer peripheral surface become a state composed of the lithium ion source.

The first belt-like material 62Q and second belt-like material 61Q are stacked on each other, and the resultant electrode stack 60A is wound on a shaft 19 from one end (one end of the lithium ion source 16A) thereof in a direction of an arrow in the drawing, whereby the wound electrode unit is obtained.

Third Embodiment

Figure 20:
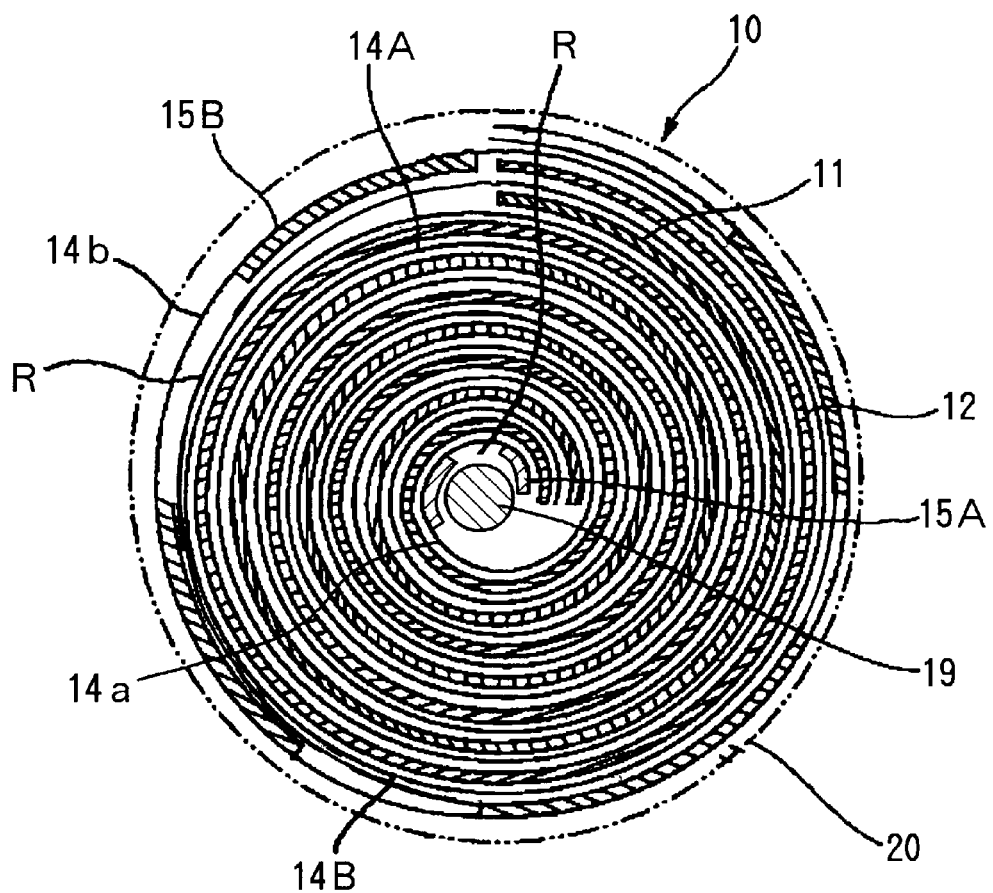
FIG. 20 is an explanatory cross-sectional view illustrating the construction of a wound-type LIC according to a third embodiment of the present invention.

FIG. 20 is an explanatory cross-sectional view illustrating the construction of a wound-type LIC according to a third embodiment of the present invention.

Figure 21:
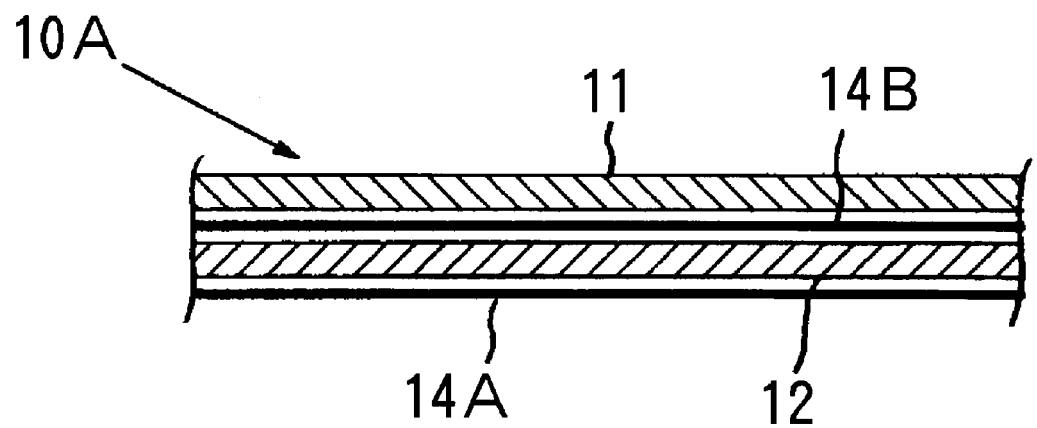
FIG. 21 is an explanatory cross-sectional view illustrating the construction of an electrode stack.

In this wound-type LIC, a wound electrode unit 10 is provided in an outer container 20. This wound electrode unit 10 is configured by winding an electrode stack 10A obtained by stacking a negative electrode 12, a second separator 14B and a positive electrode 11 in this order on one surface of a first separator 14A as illustrated in FIG. 21 on a shaft 19 from one end thereof. Here, in the positive electrode 11 and the negative electrode 12, the respective electrode layers, which will be described subsequently, are arranged so as to be opposed to each other through the second separator 14B. In the illustrated embodiment, the electrode stack 10A is wound in such a manner that the first separator 14A comes to an inner side, whereby an innermost peripheral portion 14a of the first separator 14A becomes an innermost peripheral portion of the whole wound electrode unit 10. The negative electrode 12 is longer than the positive electrode 11, and an outermost peripheral portion of the positive electrode 11 is covered with an outermost peripheral portion of the negative electrode 12 in a wound state. The first separator 14A and the second separator 14B are longer than the negative electrode 12, and the outermost peripheral portion of the negative electrode 12 is covered with an outermost peripheral portion of the first separator 14A and an outermost peripheral portion 14b of the second separator 14B in this order in a wound state, whereby the outermost peripheral portion 14b of the second separator 14B becomes an outermost peripheral portion of the whole wound electrode unit 10.

A plurality of lithium ion sources 15A each composed of rectangular and filmy lithium metal and extending to a width direction (a direction perpendicular to the paper in FIG. 20) of the first separator 14A are arranged on an inner peripheral surface of the innermost peripheral portion (the innermost peripheral portion 14a of the first separator 14A) of the wound electrode unit 10, i.e., a surface opposite to the surface, on which the negative electrode 12 has been arranged, of one end portion of the first separator 14A in a state bonded under pressure to the first separator 14A and separated from each other in a circumferential direction, and the lithium ion sources 15A are in a state coming into no direct contact with the positive electrode 11 and the negative electrode 12 by the first separator 14A. In addition, a plurality of lithium ion sources 15B each composed of rectangular and filmy lithium metal and extending to a width direction (a direction perpendicular to the paper in FIG. 20) of the second separator 14B are arranged on an inner peripheral surface of the outermost peripheral portion (the outermost peripheral portion 14b of the second separator 14B) of the wound electrode unit 10, i.e., a surface of the other end portion of the second separator 14B in a state separated from each other in a circumferential direction, and the lithium ion sources 15B are in a state coming into no direct contact with the positive electrode 11 and the negative electrode 12 by the second separator 14B. In the present invention, the term "inner peripheral surface" means a surface on the central side of the wound electrode unit, and the term "outer peripheral surface" means a surface opposite to the inner peripheral surface.

Figure 22:
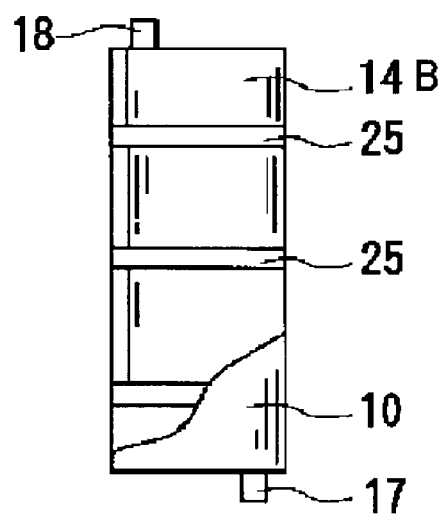
FIG. 22 is an explanatory view illustrating a wound electrode unit in the wound-type LIC according to the third embodiment of the present invention.

In the wound-type LIC of this embodiment, the wound electrode unit 10 is fixed by being wound by tapes 25 as illustrated in FIG. 22, whereby the work of housing the wound electrode unit 10 in the outer container 20 is made easy to improve the assembly workability of the wound-type LIC. A positive electrode terminal 17 and a negative electrode terminal 18 electrically connected to the positive electrode 11 and the negative electrode 12, respectively, are drawn from both ends of the wound electrode unit 10.

An electrolytic solution composed of an aprotic organic solvent electrolyte solution of a lithium salt is filled into the outer container 20.

In the wound-type LIC according to the third embodiment, as the positive electrode 11, negative electrode 12, first separator 14A, second separator 14B and lithium ion sources 15A and 15B, may be fundamentally used those of the same constructions as the positive electrode 11, negative electrode 12, separators 13A and 13B and lithium ion sources 16A to 16C in the first embodiment, and a lithium electrode current collector is preferably bonded under pressure to or stuck on the lithium ion sources 15A and 15B like the lithium ion sources 16A to 16O in the wound-type LIC according to the first embodiment.

In the third embodiment, the lithium ion source 15A or 15B may be provided on the inner peripheral surface of at least one of the outermost peripheral portion and the innermost peripheral portion in the wound electrode unit 10. However, proportions (proportions of areas of non-occupied regions R to an area of the inner peripheral surface of the outermost peripheral portion and/or an area of the inner peripheral surface of the innermost peripheral portion) of regions (hereinafter, referred to as "non-occupied regions") R not covered with the lithium ion source 15A or 15B in the inner peripheral surface of the outermost peripheral portion and/or the inner peripheral surface of the innermost peripheral portion in the wound electrode unit 10, on which the lithium ion sources have been provided, are each controlled to 10 to 70%, preferably 15 to 50%, more preferably 20 to 30%. When the proportion of the non-occupied region R falls within the above range, the penetration of the electrolytic solution is achieved in a short period of time, whereby the whole negative electrode 12 is doped with lithium ions in a short period of time, and the predoping is completed in a short period of time.

If the proportion of the non-occupied region R is less than 10%, it takes a long time to penetrate the electrolytic solution, and after all it takes a long time to uniformly dope the whole electrode layer of the negative electrode 12 with lithium ions. Such a low proportion is thus not preferable. If the proportion of the non-occupied region R exceeds 70% on the other hand, it takes a long time to complete the predoping because the area of the lithium ion source 15A or 15B opposite to the positive electrode 11 and/or the negative electrode 12. Such a high proportion is thus not preferable.

The non-occupied region R is preferably uniformly distributed throughout the inner peripheral surface of the outermost peripheral portion and/or the innermost peripheral portion in the wound electrode unit 10. For example, a plurality of lithium ion sources each having a small area are preferably arranged apart from each other without using one lithium ion source having a large area, thereby ensuring the non-occupied region R of a predetermined area because the flow passages of the electrolytic solution can widely ensured. In addition, the use of a lithium ion source with pores formed therein by punching or the like is more preferable because the non-occupied region of a predetermined area can be ensured by one lithium ion source.

Such a wound-type LIC can be produced in the following manner.

A positive electrode 11 and a negative electrode 12 illustrated in FIGS. 11 and 12 are first prepared. Specifically, a primer layer 11c composed of, for example, a carbonaceous conductive material is formed on one surface of a positive electrode current collector 11a, thereby closing pores P in the positive electrode current collector 11a, and a slurry containing a positive electrode active material and a binder is then applied to the surface of the primer layer 11c to form an electrode layer 11b, thereby preparing a positive electrode 11, and moreover a primer layer 12c composed of, for example, a carbonaceous conductive material is formed on one surface of a negative electrode current collector 12a, thereby closing pores P in the negative electrode current collector 12a, and a slurry containing a negative electrode active material and a binder is then applied to the surface of the primer layer 12c to form an electrode layer 12b, thereby preparing a negative electrode 12. A positive electrode terminal 17 and a negative electrode terminal 18 are then fixed and connected to the positive electrode current collector 11a in the positive electrode 11 and the negative electrode current collector 12a in the negative electrode 12, respectively, by, for example, stitching.

The negative electrode 12, a second separator 14B and positive electrode 11 are then stacked on one surface of a first separator 14A in this order, thereby preparing an electrode stack 10A. Here, the positive electrode 11 and the negative electrode 12 are arranged in such a manner that the electrode layers 11b and 12b thereof are opposed to each other through the second separator 14B. The electrode stack 10A prepared is then wound on a shaft 19 from one end of the electrode stack 10A in such a manner that the first separator 14A comes to an inner side, thereby preparing a wound electrode unit 10, and tapes 25 are wound on this wound electrode unit 10, thereby fixing the wound electrode unit.

Figure 23:
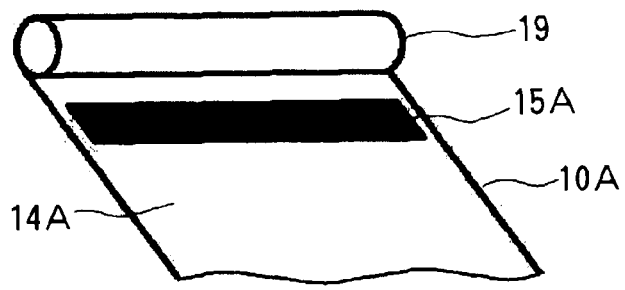
FIG. 23 is an explanatory view illustrating a state that a lithium ion source has been bonded under pressure to a surface of a first separator at an end portion thereof.
Figure 24:
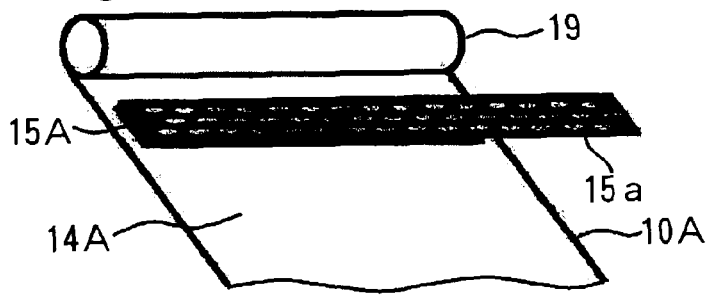
FIG. 24 is an explanatory view illustrating a state that a lithium electrode current collector has been bonded under pressure to the lithium ion source bonded under pressure to the first separator.
Figure 25:
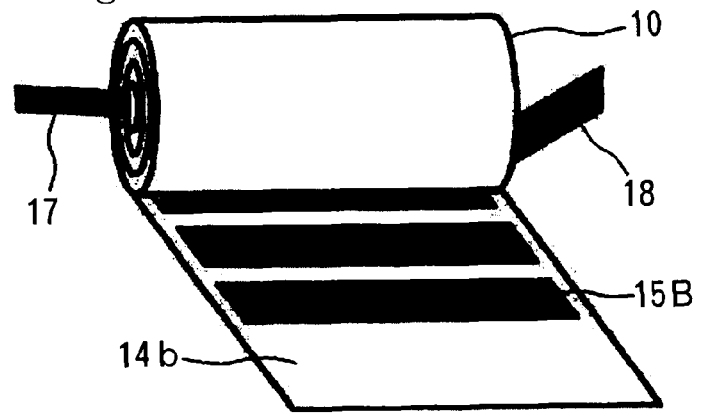
FIG. 25 is an explanatory view illustrating a state that a lithium ion source has been bonded under pressure to a surface of a second separator at a marginal portion of the separator.
Figure 26:
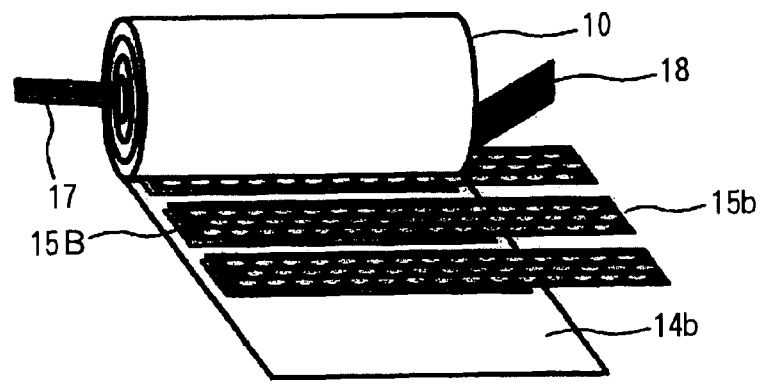
FIG. 26 is an explanatory view illustrating a state that a lithium electrode current collector has been bonded under pressure to the lithium ion source bonded under pressure to the second separator.

In the abode-described wound electrode unit, as illustrated in FIG. 23, a lithium ion source 15A provided on the inner peripheral surface of the innermost peripheral portion in the wound electrode unit 10 is bonded under pressure and fixed to a surface opposite to the surface, on which the negative electrode 12 has been arranged, of one end portion of the first separator 14A, which becomes the innermost peripheral portion in the wound electrode unit 10, and as illustrated in FIG. 24, a lithium electrode current collector 15a is further bonded under pressure and fixed on this lithium ion source 15A. On the other hand, as illustrated in FIG. 25, a lithium ion source 15B provided on the outer peripheral surface in the wound electrode unit 10 is bonded under pressure and fixed to the surface of the other end portion of the second separator 14B, which becomes the outermost peripheral portion in the wound electrode unit 10, and as illustrated in FIG. 26, a lithium electrode current collector 15b is further bonded under pressure and fixed on this lithium ion source 15B. In this manner, the lithium ion sources 15A and 15B are arranged on the inner peripheral surface and the outer peripheral surface of the wound electrode unit 10, respectively.

The wound electrode unit 10 prepared in this manner is housed into an outer container 20, an electrolytic solution is filled into the outer container 20, and the outer container 20 is sealed in a state that the positive electrode terminal 17 and the negative electrode terminal 18 in the wound electrode unit 10 have been drawn out of the outer container 20, thereby obtaining a wound-type LIC.

Since the electrolytic solution capable of supplying lithium ions is filled into the outer container 20 in the wound-type LIC produced in this manner, the negative electrode 12 and/or the positive electrode 11 is doped with lithium ions discharged from the lithium ion sources 15A and 15B by electrochemical contact of the negative electrode 12 and/or the positive electrode 11 with the lithium ion sources 15A and 15B when left to stand for a proper period of time.

According to the present invention, non-occupied regions R not covered with the lithium ion sources 15A and 15B exist on the inner peripheral surfaces of the outermost peripheral portion and/or the innermost peripheral portion in the wound electrode unit 10, on which the lithium ion sources 15A and 15B have been provided, and the proportions of the non-occupied regions R are each 10 to 70% based on the whole area of the inner peripheral surface of the outermost peripheral portion and/or the innermost peripheral portion in the wound electrode unit 10, so that the electrolytic solution penetrates in the interior of the wound electrode unit 10 in a short period of time, and the whole negative electrode 12 is uniformly doped with lithium ions in a short period of time, resulting in achieving high productivity.

The electrode stack 10A is wound in a state that the lithium ion sources 15A and 15B have been arranged on the first separator 14A and the second separator 14B in advance, whereby the preparation of the wound electrode unit 10 and the arrangement of the lithium ion sources 15A and 15B can be conducted in the same step, so that higher productivity is achieved.

Fourth Embodiment

Figure 27:
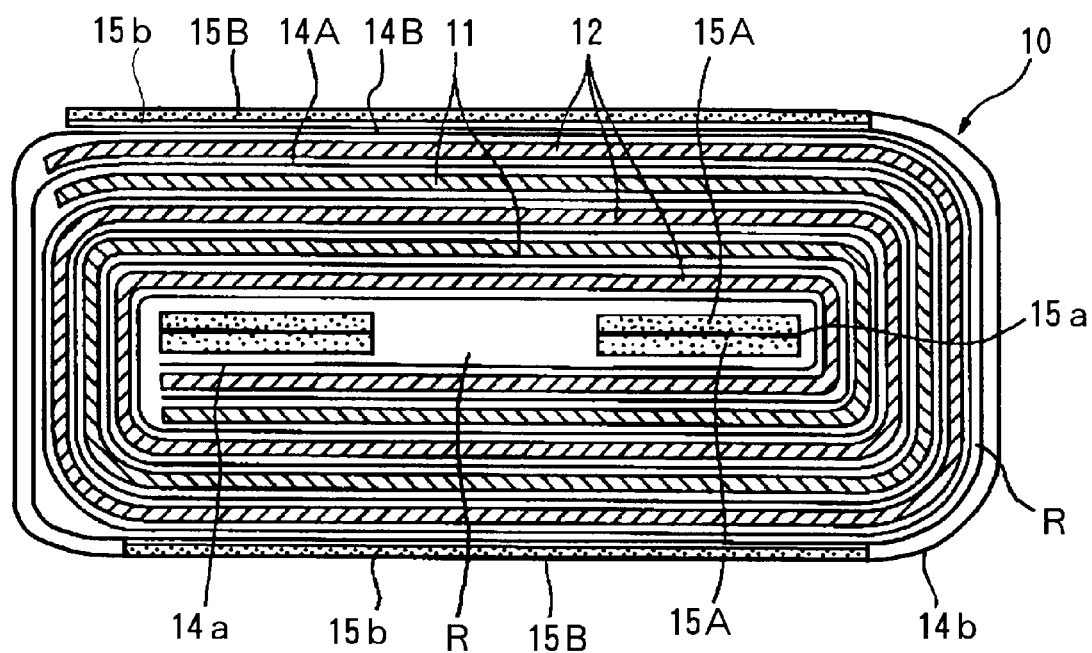
FIG. 27 is an explanatory cross-sectional view illustrating the construction of another exemplary wound electrode unit in a wound-type LIC according to a fourth embodiment of the present invention.

FIG. 27 is an explanatory cross-sectional view illustrating the construction of a wound electrode unit in a wound-type LIC according to a fourth embodiment of the present invention.

A wound electrode unit 10 in the wound-type LIC of this embodiment is configured by winding an electrode stack obtained by stacking a negative electrode 12, a second separator 14B and a positive electrode 11 in this order on one surface of a first separator 14A in the form of a flattened cylinder from one end of the electrode stack in such a manner that the first separator 14A comes to an inner side, whereby an innermost peripheral portion 14a of the first separator 14A becomes an innermost peripheral portion of the whole wound electrode unit 10. An outermost peripheral portion of the positive electrode 11 is covered with an outermost peripheral portion of the negative electrode 12 in a wound state, and the outermost peripheral portion of the negative electrode 12 is covered with an outermost peripheral portion of the first separator 14A and an outermost peripheral portion 14b of the second separator 14B in this order in a wound state, whereby the outermost peripheral portion 14b of the second separator 14B becomes an outermost peripheral portion of the whole wound electrode unit 10.

A plurality of lithium ion sources 15A each composed of rectangular and filmy lithium metal bonded under pressure to both surfaces of a lithium electrode current collector 15a and extending to a width direction (a direction perpendicular to the paper in FIG. 27) of the first separator 14A are arranged on an inner peripheral surface of the innermost peripheral portion (the innermost peripheral portion 14a of the first separator 14A) of the wound electrode unit 10, i.e., a surface opposite to the surface, on which the negative electrode 12 has been arranged, of one end portion of the first separator 14A in a state separated from each other, and the lithium ion sources 15A are in a state coming into no direct contact with the positive electrode 11 and the negative electrode 12 by the first separator 14A. In addition, a plurality of lithium ion sources 15B each composed of rectangular and filmy lithium metal bonded under pressure to one surface of a lithium electrode current collector 15b and extending to a width direction (a direction perpendicular to the paper in FIG. 27) of the second separator 14B are arranged on an inner peripheral surface of the outermost peripheral portion (the outermost peripheral portion 14b of the second separator 14B) of the wound electrode unit 10, i.e., a surface of the other end portion of the second separator 14B, and the lithium ion sources 15B are in a state coming into no direct contact with the positive electrode 11 and the negative electrode 12 by the second separator 14B. In the illustrated embodiment, two lithium ion sources 15B are respectively arranged on one surface in the outer periphery of the wound electrode unit 10 and the other surface opposite to this surface.

Proportions non-occupied regions R in the inner peripheral surface of the outermost peripheral portion and/or the inner peripheral surface of the innermost peripheral portion in the wound electrode unit 10, on which the lithium ion sources 15A and 15B have been provided, are each controlled to 10 to 70%, preferably 15 to 50%, more preferably 20 to 30%.

In the wound-type LIC according to the fourth embodiment, as the positive electrode 11, negative electrode 12, first separator 14A, second separator 14B and lithium ion sources 15A and 15B, may be fundamentally used those of the same constructions as the positive electrode 11, negative electrode 12, separators 13A and 13B and lithium ion sources 16A to 16C in the first embodiment, and the lithium electrode current collector is preferably bonded under pressure to or stuck on the lithium ion sources 15A and 15B like the lithium ion sources 16A to 16C in the wound-type LIC according to the first embodiment.

The wound electrode unit 10 in the wound-type LIC according to the fourth embodiment can be prepared in the same manner as the wound electrode unit 10 in the wound-type LIC according to the first embodiment.

The wound-type LIC having such a wound electrode unit 10 is obtained by housing the wound electrode unit 10 in an outer container, filling an electrolytic solution into the outer container and sealing the outer container in a state that a positive electrode terminal 17 and a negative electrode terminal 18 in the wound electrode unit 10 have been drawn out of the outer container.

Since the electrolytic solution capable of supplying lithium ions is filled into the outer container in the wound-type LIC produced in this manner, the negative electrode 12 and/or the positive electrode 12 is doped with lithium ions discharged from the lithium ion sources 15A and 15B by electrochemical contact of the negative electrode 12 and/or the positive electrode 11 with the lithium ion sources 15A and 15B when left to stand for a proper period of time.

According to such a wound-type LIC, the proportions of non-occupied regions R in the inner peripheral surfaces of the outermost peripheral portion and/or the innermost peripheral portion in the wound electrode unit 10, on which the lithium ion sources 15A and 15B have been provided, are each 10 to 70%, so that the electrolytic solution penetrates in the interior of the wound electrode unit 10 in a short period of time, and the whole negative electrode 12 is uniformly doped with lithium ions in a short period of time, resulting in achieving high productivity.

The electrode stack 10A is wound in a state that the lithium ion sources 15A and 15B have been arranged on the first separator 14A and the second separator 14B in advance, whereby the preparation of the wound electrode unit 10 and the arrangement of the lithium ion sources 15A and 15B can be conducted in the same step, so that higher productivity is achieved.

Although the embodiments of the present invention have been described above, the present invention is not limited to these embodiments, and various changes or modifications may be added thereto.

For example, the present invention is not limited to the wound-type LIC, may be suitably applied to a lithium ion secondary battery, and may also be applied to other wound-type accumulators.

EXAMPLES

Examples of the present invention will hereinafter be specifically described. However, the present invention is not limited to these Examples.

Example 1

Preparation Example 1 of Negative Electrode

A plate formed from a phenol resin and having a thickness of 0.5 mm was placed in a SILICONIT electric furnace, heated to 500° C. at a rate of 50° C./hr. under a nitrogen atmosphere and further heated to 660° C. at a rate of 10° C./hr. to heat-treat the plate, thereby synthesizing PAS. The resultant plate-like PAS was ground by a disk mill, thereby obtaining PAS powder. The H/C ratio of this PAS powder was 0.21.

Then, 100 parts by mass of the PAS powder were fully mixed with a solution with 10 parts by mass of polyvinylidene fluoride powder dissolved in 80 parts by mass of N-methylpyrrolidone, thereby obtaining a negative electrode slurry. This negative electrode slurry was intermittently applied to both surfaces of a negative electrode current collector composed of copper expanded metal (product of Nippon Metal Industry Co., Ltd.) having a thickness of 32 µm (porosity: 50%) by a die coater to pattern-form electrode layers of a negative electrode in such a manner that a coated portion length is 15.2 cm, and an uncoated portion length is 10 cm, and the electrode layers were press-treated to obtain a negative electrode [1] having an overall thickness (total thickness of the thicknesses of the electrode layers of the negative electrode applied to both surfaces and the thickness of the negative electrode current collector) of 77 µm. In addition, electrode layers of a negative electrode were pattern-formed likewise in such a manner that a coated portion length is 36.1 cm, and an uncoated portion length is 10 cm, and the electrode layers were press-treated to obtain a negative electrode [2] having an overall thickness (total thickness of the thicknesses of the electrode layers of the negative electrode applied to both surfaces and the thickness of the negative electrode current collector) of 77 µm.

The negative electrode [1] and the negative electrode [2] were each used as a working electrode, lithium metal was used as a counter electrode and a reference electrode, and a solution with LiPF$_6$ dissolved in propylene carbonate at a concentration of 1 mol/L was used as an electrolytic solution to produce a trial simulation cell, and lithium ions were charged in an amount of 400 mAh/g based on the mass of the negative electrode active material to determine capacitances per unit mass of the negative electrode [1] and the negative electrode [2]. As a result, the capacitances were both 661 F/g.

Preparation Example 1 of Positive Electrode

One hundred parts by mass of commercially available active carbon having a specific surface area of 1,950 m$^2$/g, 10 parts by mass of acetylene black, 7 parts by weight of an acrylic binder and 4 parts by mass of carboxymethyl cellulose were dispersed in water and fully mixed, thereby obtaining a positive electrode slurry.

On the other hand, a non-aqueous carbonaceous conductive paint "EB-815" (product of Acheson Japan Limited) was intermittently applied to both surfaces of aluminum expanded metal (product of Nippon Metal Industry Co., Ltd.) having a thickness of 35 μm (porosity: 50%) by a die coater to pattern-form conductive layers in such a manner that a coated portion length is 13.2 cm, and an uncoated portion length is 10 cm, and the conductive layers were dried, thereby obtaining a positive electrode current collector [1]. The total thickness (total thickness of the thickness of the aluminum expanded metal and the thicknesses of the conductive layers) thereof was 52 μm, and the through-pores in the coated portion were almost closed by the conductive paint. The positive electrode slurry [1] was further intermittently applied to the conductive layers on both surfaces by a die coater to pattern-form electrode layers of a positive electrode in such a manner that a coated portion length is 13.2 cm, and an uncoated portion length is 10 cm, and the electrode layers were press-treated to obtain a positive electrode [1] having an overall thickness (total thickness of the thicknesses of the electrode layers of the positive electrode applied to both surfaces and the thickness of the positive electrode current collector [1]) of 212 μm. In addition, electrode layers of a positive electrode were pattern-formed likewise in such a manner that a coated portion length is 26.1 cm, and an uncoated portion length is 10 cm, and the electrode layers were press-treated to obtain a positive electrode [2] having an overall thickness (total thickness of the thicknesses of the electrode layers of the positive electrode applied to both surfaces and the thickness of the positive electrode current collector [1]) of 212 μm.

The positive electrode [1] and the positive electrode [2] were each used as a working electrode, lithium metal was used as a counter electrode and a reference electrode, and a solution with LiPF$_6$ dissolved in propylene carbonate at a concentration of 1 mol/L was used as an electrolytic solution to produce a trial simulation cell to determine capacitances per unit mass of the positive electrode [1] and the positive electrode [2] from a discharge time between 3.5 V and 2.5 V. As a result, the capacitances are both 119 F/g.

Preparation Example 1 of Wound Electrode Unit

The negative electrode [1] having the thickness of 77 μm was cut into a width of 5.6 cm and a length of 16.2 cm in such a manner that the uncoated portion is included at a position of 10 mm from the end, and a nickel terminal was arranged on the uncoated portion of the negative electrode current collector and connected to the negative electrode current connector by ultrasonic welding. The positive electrode [1] having the thickness of 212 μm was cut into a width of 5.4 cm and a length of 14.2 cm in such a manner that the uncoated portion is included at a position of 10 mm from the end, and an aluminum terminal was arranged on the uncoated portion of the positive electrode current collector and connected to the positive electrode current connector by ultrasonic welding. In addition, the negative electrode [2] was cut into a width of 5.6 cm and a length of 37.1 cm likewise, a nickel terminal was arranged on the uncoated portion of the negative electrode current collector and connected to the negative electrode current connector by ultrasonic welding, the positive electrode [2] was cut into a width of 5.4 cm and a length of 27.1 cm, and an aluminum terminal was arranged on the uncoated portion of the positive electrode current collector and connected to the positive electrode current connector by ultrasonic welding.

A cellulose/rayon-mixed nonwoven fabric having a thickness of 35 μm was used as separators, the positive electrode [1] and the positive electrode [2] were arranged on a separator (53A) in this order from the side of a shaft (19) according to FIG. 18, and a lithium ion source [1], the negative electrode [1], a lithium ion source [2], the negative electrode [2] and a lithium ion source [3] were arranged on a separator (53B) in this order from the side of the shaft (19) to form an electrode stack. The electrode stack was wound from one end thereof in such a manner that the respective terminals of the positive electrode and negative electrode are directed to opposite directions, and an outermost periphery of the wound body was held by tapes to prepare a wound electrode unit [1]. Three wound electrode units were prepared in total.

Incidentally, one lithium metal having a thickness of 60 μm, a width of 5.4 cm and a length of 1.1 cm was used as the lithium ion source [1] located at an inner peripheral surface, i.e., a winding-starting portion, one lithium metal having a thickness of 60 μm, a width of 5.4 cm and a length of 3.1 cm was used as the lithium ion source [2] located in an intra-electrode space, and one lithium metal having a thickness of 120 μm, a width of 5.4 cm and a length of 5.0 cm was used as the lithium ion source [3] located at an outer peripheral surface. These lithium ion sources were bonded under pressure to the separator in advance, and copper expanded metal (lithium electrode current collector) having a width of 7.4 cm was cut into the same lengths as the respective lithium metals, arranged on these lithium metals and bonded under pressure thereto by pressing. The lithium ion sources could be simply inserted by virtue of this process.

In this wound electrode unit [1], non-lithium electrode occupied rates on the inner peripheral surface, the outer peripheral surface and the outer peripheral surface of the wound body were each controlled to 0%.

Preparation Example 1 of Cell

The wound electrode unit [1] was inserted into the interior of an iron-nickel plated outer can having an outer diameter of 18 mm and a height of 65 mm, the negative electrode terminal was resistance-welded to the outer can at a bottom of the outer can, and grooving work was then performed at an upper portion of the can. After a polypropylene gasket was then fitted at the upper portion of the can, the positive electrode terminal was resistance-welded to a positive electrode cap.

Eight grams of a solution with LiPF$_6$ dissolved in propylene carbonate at a concentration of 1 mol/L was injected as an electrolytic solution into the can. As a result, it took 4 minutes for vacuum impregnating.

Thereafter, the positive electrode cap was put on the outer can, and the outer can was swaged, thereby assembling 3 cylindrical lithium ion capacitor cells [1].

[Initial Evaluation of Cell]

Among the lithium ion capacitor cells [1], one cell was disassembled after left to stand for 4 days from the assembly of the cell. As a result, all the lithium metals were completely lost. From this fact, it is judged that lithium ions for obtaining an capacitance of 660 F/g or more per unit mass of the negative electrode active material were preliminarily charged in 4 days after the assembly of the cell.

[Evaluation of Properties of Cell]

The lithium ion capacitor cell [1] was subjected for 0.5 hours to constant-current-constant-voltage charge that charging is conducted at a constant current of 750 mA until a cell voltage becomes 3.8 V and a constant voltage of 3.8 V is then applied. Discharging was then conducted at a constant current of 750 mA until a cell voltage became 2.2 V. This cycle of 3.8 V-2.2 V was repeated to evaluate a cell capacity, an energy density and an internal resistance upon tenth discharging. The evaluation was indicated as an average value of 2 cells. The results are shown in Table 1.

TABLE 1

|  | Capacitance (F) | Energy density (Wh/L) | Internal resistance (mΩ) |
| --- | --- | --- | --- |
| Example 1 | 142 | 11.5 | 27 |

In the preparation process of the lithium ion capacitor cell [1], it was confirmed that the wound electrode unit [1] is obtained in a short period of time. This is considered to be attributable to the fact that the lithium ion sources (lithium metals) were bonded under pressure to the separator in advance. It was also confirmed that the time required for doping with lithium ions is short though the time required to complete the injection of the electrolytic solution is long. This is considered to be attributable to the fact that the lithium ion source (lithium metal) was arranged not only on the inner peripheral surface and the outer peripheral surface, but also in the intra-electrode space.

Comparative Example 1

Preparation Example 2 of Negative Electrode

A negative electrode slurry was obtained in the same manner as in Preparation Example 1 of negative electrode, and this negative electrode slurry was intermittently applied to both surfaces of a negative electrode current collector composed of copper expanded metal (product of Nippon Metal Industry Co., Ltd.) having a thickness of 32 μm (porosity: 50%) by a die coater to pattern-form electrode layers of a negative electrode in such a manner that a coated portion length is 49.3 cm, and an uncoated portion length is 10 cm, and the electrode layers were press-treated to obtain a negative electrode [3] having an overall thickness (total thickness of the thicknesses of the electrode layers of the negative electrode applied to both surfaces and the thickness of the negative electrode current collector) of 77 μm.

Preparation Example 2 of Positive Electrode

On the other hand, a non-aqueous carbonaceous conductive paint "EB-815" (product of Acheson Japan Limited) was intermittently applied to both surfaces of aluminum expanded metal (product of Nippon Metal Industry Co., Ltd.) having a thickness of 35 μm (porosity: 50%) by a die coater to pattern-form conductive layers in such a manner that a coated portion length is 46.3 cm, and an uncoated portion length is 10 cm, and the conductive layers were dried, thereby obtaining a positive electrode current collector [2]. The total thickness (total thickness of the thickness of the aluminum expanded metal and the thicknesses of the conductive layers) thereof was 52 μm, and the through-pores in the coated portion were almost closed by the conductive paint. A positive electrode slurry [1] obtained in the same manner as in Preparation Example 1 of positive electrode was further intermittently applied to the conductive layers on both surfaces by a die coater to pattern-form electrode layers of a positive electrode in such a manner that a coated portion length is 43.6 cm, and an uncoated portion length is 10 cm, and the electrode layers were press-treated to obtain a positive electrode [3] having an overall thickness (total thickness of the thicknesses of the electrode layers of the positive electrode applied to both surfaces and the thickness of the positive electrode current collector [2]) of 212 μm.

Preparation Example 2 of Wound Electrode Unit

The negative electrode [3] having the thickness of 77 μm was cut into a width of 5.6 cm and a length of 49.3 cm in such a manner that the uncoated portion is included at a position of 10 mm from the end, and a nickel terminal was arranged on the uncoated portion of the negative electrode current collector and connected to the negative electrode current connector by ultrasonic welding. The positive electrode [3] having the thickness of 212 μm was cut into a width of 5.4 cm and a length of 46.3 cm in such a manner that the uncoated portion is included at a position of 10 mm from the end, and an aluminum terminal was arranged on the uncoated portion of the positive electrode current collector and connected to the positive electrode current connector by ultrasonic welding.

A cellulose/rayon-mixed nonwoven fabric having a thickness of 35 μm was used as separators, and an electrode stack was formed so as to have a structure composed of continuous belt-like positive and negative electrodes without forming intra-positive electrode spaces and intra-negative electrode spaces in FIG. 18. The electrode stack was wound from one end thereof in such a manner that the respective terminals of the positive electrode and negative electrode are directed to opposite directions, and an outermost periphery of the wound body was held by tapes to prepare a wound electrode unit [2]. Three wound electrode units were prepared in total.

Incidentally, one lithium metal having a thickness of 135 μm, a width of 5.4 cm and a length of 1.1 cm was used as a lithium ion source located at an inner peripheral surface, i.e., a winding-starting portion, and one lithium metal having a thickness of 135 μm, a width of 5.4 cm and a length of 5.0 cm was used as a lithium ion source located at an outer peripheral surface. These lithium ion sources were bonded under pressure to the separator in advance, and copper expanded metal (lithium electrode current collector) having a width of 7.4 cm was cut into the same lengths as the respective lithium metals, arranged on these lithium metals and bonded under pressure thereto by pressing. The lithium ion sources could be simply inserted by virtue of this process.

In this wound electrode unit [2], non-lithium electrode occupied rates on the inner peripheral surface, the outer peripheral surface and the outer peripheral surface of the wound body were each controlled to 0%.

Preparation Example 2 of Cell

The wound electrode unit [2] was inserted into the interior of an iron-nickel plated outer can having an outer diameter of 18 mm and a height of 65 mm, the negative electrode terminal was resistance-welded to the outer can at a bottom of the outer can, and grooving work was then performed at an upper portion of the can. After a polypropylene gasket was then fitted at the upper portion of the can, the positive electrode terminal was resistance-welded to a positive electrode cap.

Nine grams of a solution with $LiPF_6$ dissolved in propylene carbonate at a concentration of 1 mol/L was injected as an electrolytic solution into the can. As a result, it took 4 minutes for vacuum impregnating.

Thereafter, the positive electrode cap was put on the outer can, and the outer can was caulked, thereby assembling 3 cylindrical lithium ion capacitor cells [2].

[Initial Evaluation of Cell]

Among the lithium ion capacitor cells [2], one cell was disassembled after left to stand for 4 days from the assembly of the cell. As a result, about 30% of the lithium metals remained. Therefore, the cell was disassembled after left to stand for additional 3 days. As a result, the lithium metals were completely lost. From this fact, it is judged that lithium ions for obtaining an capacitance of 660 F/g or more per unit mass of the negative electrode active material were preliminarily charged in 7 days after the assembly of the cell.

[Evaluation of Properties of Cell]

The lithium ion capacitor cell [2] was subjected for 0.5 hours to constant-current-constant-voltage charge that charging is conducted at a constant current of 750 mA until a cell voltage becomes 3.8 V and a constant voltage of 3.8 V is then applied. Discharging was then conducted at a constant current of 750 mA until a cell voltage became 2.2 V. This cycle of 3.8 V-2.2 V was repeated to evaluate a cell capacity, an energy density and an internal resistance upon tenth discharging. The evaluation was indicated as an average value of 2 cells. The results are shown in Table 2.

TABLE 2

|  | Capacitance (F) | Energy density (Wh/L) | Internal resistance (mΩ) |
| --- | --- | --- | --- |
| Comparative Example 1 | 165 | 13.3 | 28.6 |

In the preparation process of the lithium ion capacitor cell [2], it was confirmed that the wound electrode unit [2] is obtained in a short period of time. This is considered to be attributable to the fact that the lithium ion sources (lithium metals) were bonded under pressure to the separator in advance. However, it was confirmed that the time required to complete the injection of the electrolytic solution is long, and the time required for doping with lithium ions is also longer than the lithium ion capacitor cell [1] according to Example 1. This is considered to be attributable to the fact that the number of the lithium ion sources (lithium metals) arranged is smaller than the lithium ion capacitor cell [1] according to Example 1.

Comparative Example 2

Preparation Example 3 of Wound Electrode Unit

A wound electrode unit [3] was prepared in the same manner as in Preparation Example 2 of wound electrode unit in Comparative Example 1 except that lithium metal having a thickness of 60 μm, a width of 5.4 cm and a length of 1.0 cm was used as a lithium ion source located at an inner peripheral surface, lithium metal having a thickness of 140 μm, a width of 5.4 cm and a length of 5.0 cm was used as a lithium ion source located at an outer peripheral surface, lithium metal having a thickness of 60 μm, a width of 5.4 cm and a length of 3.1 cm was inserted by stacking on the negative electrode as a lithium ion source located at an intermediate portion between a first belt-like material for the negative electrode and a second belt-like material for the positive electrode in the electrode stack, and this electrode stack was wound. Three wound electrode units were prepared in total.

Incidentally, in this wound electrode unit [3], non-lithium electrode occupied rates on the inner peripheral surface, the outer peripheral surface and the outer peripheral surface of the wound body were each controlled to 0%.

Preparation Example 3 of Cell

The wound electrode unit [3] was inserted into the interior of an iron-nickel plated outer can having an outer diameter of 18 mm and a height of 65 mm, the negative electrode terminal was resistance-welded to the outer can at a bottom of the outer can, and grooving work was then performed at an upper portion of the can. After a polypropylene gasket was then fitted at the upper portion of the can, the positive electrode terminal was resistance-welded to a positive electrode cap.

Nine grams of a solution with $LiPF_6$ dissolved in propylene carbonate at a concentration of 1 mol/L was injected as an electrolytic solution into the can. As a result, it took 4 minutes for vacuum impregnating.

Thereafter, the positive electrode cap was put on the outer can, and the outer can was caulked, thereby assembling 3 cylindrical lithium ion capacitor cells [3].

[Initial Evaluation of Cell]

Among the lithium ion capacitor cells [3], one cell was disassembled after left to stand for 4 days from the assembly of the cell. As a result, the lithium metals were almost lost though some traces of the lithium metal remained in the intra-electrode space. From this fact, it is judged that lithium ions for obtaining an capacitance of 660 F/g or more per unit mass of the negative electrode active material were preliminarily charged in about 4 days after the assembly of the cell.

[Evaluation of Properties of Cell]

The lithium ion capacitor cell [3] was subjected for 0.5 hours to constant-current-constant-voltage charge that charging is conducted at a constant current of 750 mA until a cell voltage becomes 3.8 V and a constant voltage of 3.8 V is then applied. Discharging was then conducted at a constant current of 750 mA until a cell voltage became 2.2 V. This cycle of 3.8 V-2.2 V was repeated to evaluate a cell capacity, an energy density and an internal resistance upon tenth discharging. The evaluation was indicated as an average value of 2 cells. The results are shown in Table 3.

TABLE 3

|  | Capacitance (F) | Energy density (Wh/L) | Internal resistance (mΩ) |
| --- | --- | --- | --- |
| Comparative Example 2 | 165 | 13.3 | 33 |

In the preparation process of the lithium ion capacitor cell [3], it was confirmed that the wound electrode unit [3] is obtained in a short period of time. This is considered to be attributable to the fact that the lithium ion sources (lithium metals) were bonded under pressure to the separator in advance. It was also confirmed that the time required for doping with lithium ions is short like the lithium ion capacitor cell [1] according to Example 1 though the time required to complete the injection of the electrolytic solution is long. This is considered to be attributable to the fact that the number of the lithium ion sources (lithium metals) arranged is large like the lithium ion capacitor cell [1] according to Example 1. However, it was confirmed that an internal resistance is high. This is presumed to be attributable to the fact that the lithium metal arranged at the intermediate portion underwent inconvenience on the negative electrode because a resistance at a place where the lithium metal came into contact with the negative electrode increased.

When one cell was disassembled after charge/discharge was conducted 100 times, dendrite (arborescent lithium metal) deposited on the lithium electrode current collector, so that it is considered that a problem is offered even from the viewpoints of durability and safety.

Accordingly, when the lithium metal is arranged at the intermediate portion, it is considered that there is need of dividing the electrode in order for the lithium metal not to oppose to the positive electrode like the lithium ion capacitor cell [1] according to Example 1.

Example 2

(1) Preparation of Negative Electrode

A plate formed from a phenol resin and having a thickness of 0.5 mm was placed in a SILICONIT electric furnace, heated to 500° C. at a rate of 50° C./hr. under a nitrogen atmosphere and further heated to 660° C. at a rate of 10° C./hr. to heat-treat the plate, thereby preparing a PAS plate. The resultant PAS plate was ground by a disk mill, thereby preparing PAS powder. The H/C ratio of this PAS powder was 0.21.

Then, 100 parts by mass of the PAS powder prepared and 10 parts by mass of polyvinylidene fluoride powder were added to 80 parts by mass of N-methylpyrrolidone to dissolve or disperse them, thereby preparing a slurry for negative electrode. This slurry for negative electrode was intermittently applied to both surfaces of a negative electrode current collector composed of copper expanded metal (product of Nippon Metal Industry Co., Ltd.) having a thickness of 32 μm and a porosity of 50% by a die coater in such a manner that a coated portion length is 49.3 cm, an uncoated portion length is 10 cm, and dried, and the resultant coating films were press-treated to form electrode layers, thereby preparing a negative electrode.

The thickness (total thickness of the negative electrode current collector and the electrode layers formed on both surfaces thereof) of the resultant negative electrode was 77 μm.

This negative electrode was used as a working electrode, lithium metal was used as a counter electrode and a reference electrode, a solution with $LiPF_6$ dissolved in propylene carbonate at a concentration of 1 mol/L was used as an electrolytic solution to fabricate a capacitor, and lithium ions were charged in an amount of 400 mAh/g based on the mass of the negative electrode active material to determine an capacitance per unit weight of the negative electrode. As a result, the capacitance was 661 F/g.

(2) Preparation of Positive Electrode

One hundred parts by mass of active carbon having a specific surface area of 1,950 $m^2$/g, 10 parts by mass of acetylene black, 7 parts by weight of an acrylic binder and 4 parts by mass of carboxymethyl cellulose were added to water and dispersed therein, thereby preparing a slurry for positive electrode.

On the other hand, a non-aqueous carbonaceous conductive paint (product of Acheson Japan Limited; EB-815) was intermittently applied to both surfaces of a positive electrode current collector composed of aluminum expanded metal (product of Nippon Metal Industry Co., Ltd.) having a thickness of 35 μm and a porosity of 50% by a die coater in such a manner that a coated portion length is 46.3 cm, and an uncoated portion length is 10 cm, and dried, thereby forming primer layers. The total thickness of the positive electrode current collector and the primer layers formed on both surfaces thereof was 52 μm, and the pores in the positive electrode current collector were closed by the primer layers.

The slurry for positive electrode prepared was then intermittently applied to both surfaces of the positive electrode current collector, on which the primer layers had been formed, by a die coater in such a manner that a coated portion length is 46.3 cm, and an uncoated portion length is 10 cm, and dried, and the resultant coating films were press-treated, thereby forming electrode layers to thus prepare a positive electrode.

The thickness (total thickness of the positive electrode current collector, and the primer layers and electrode layers formed on both surfaces thereof) of the resultant positive electrode was 212 μm.

This positive electrode was used as a working electrode, lithium metal was used as a counter electrode and a reference electrode, and a solution with $LiPF_6$ dissolved in propylene carbonate at a concentration of 1 mol/L was used as an electrolytic solution to fabricate a capacitor to determine an capacitance per unit weight of the positive electrode from a discharge time between 3.5 V and 2.5 V. As a result, the capacitance was 119 F/g.

(3) Preparation of Wound Electrode Unit

The negative electrode prepared was cut into a width of 5.6 cm and a length of 49.3 cm in such a manner that the uncoated portion of the negative electrode current collector is included at a position of 10 mm from the end, and a nickel terminal was arranged on the uncoated portion of the negative electrode current collector and connected thereto by ultrasonic welding.

The positive electrode prepared was cut into a width of 5.4 cm and a length of 46.3 cm in such a manner that the uncoated portion of the positive electrode current collector is included at a position of 10 mm from the end, and an aluminum terminal was arranged on the uncoated portion of the positive electrode current collector and connected thereto by ultrasonic welding.

A first separator and a second separator, which were each composed of a cellulose/rayon-mixed nonwoven fabric having a thickness of 35 μm, were provided, a lithium ion source composed of a lithium metal foil having a size of 5.4 cm in length and 0.9 cm in width and a thickness of 170 μm was arranged on the surface of one end portion of the first separator, which becomes an innermost peripheral portion of the resulting wound electrode unit, and bonded under pressure thereto, thereby fixing it, and a lithium electrode current collector composed of copper expanded metal having a size of 7.4 cm in length and 0.9 cm in width, a thickness of 32 μm and a porosity of 50% was arranged on this lithium ion source and bonded under pressure thereto, thereby fixing it. On the other hand, 2 lithium ion sources each composed of a lithium metal foil having a size of 5.4 cm in length and 2.0 cm in width and a thickness of 170 μm were arranged in a state separated from each other at an interval of 0.5 cm on the surface of the other end portion of the second separator, which becomes an outermost peripheral portion of the resulting wound electrode unit, and bonded under pressure thereto, thereby fixing them, and lithium electrode current collectors each composed of copper expanded metal having a size of 5.4 cm in length and 2.0 cm in width, a thickness of 32 μm and a porosity of 50% were arranged on these lithium ion sources and bonded under pressure thereto, thereby fixing them.

The negative electrode, the second separator and the positive electrode were stacked in this order on a surface opposite to the surface, to which the lithium ion source had been bonded under pressure, of the first separator, thereby forming an electrode stack. Here, the positive electrode and negative electrode were arranged in such a manner that the respective electrode layers are opposed to each other through the second separator. This electrode stack was wound on a stainless steel shaft having a diameter of 3.5 mm from one end of the electrode stack in such a manner that the first separator comes to an inner side, thereby preparing a cylindrical wound electrode unit having an inner diameter of 3.5 mm and an outer diameter of 15.5 mm, and tapes were wound on this wound electrode unit, thereby fixing the wound electrode unit.

Proportions of regions (non-occupied regions) not covered with the lithium ion source in the inner peripheral surfaces of the outermost peripheral portion and the innermost peripheral portion in the wound electrode unit were each 20%.

Since the respective lithium ion sources were bonded under pressure to the first separator and the second separator in advance, the preparation of the wound electrode unit could be easily conducted.

(4) Fabrication of Wound-Type LIC

An iron-nickel plated bottomed cylindrical outer container member having an outer diameter of 18 mm and a height of 65 mm was provided, and the wound electrode unit prepared was housed into the interior of this outer container member, the negative electrode terminal of the wound electrode unit was resistance-welded to an inner bottom of the outer container member, and grooving work was then performed at an upper portion of the outer container member. After a polypropylene gasket was then fitted at the upper portion of the outer container member, the positive electrode terminal of the wound electrode unit was resistance-welded to a lid member. Nine grams of a solution with LiPF$_6$ dissolved in propylene carbonate at a concentration of 1 mol/L was injected as an electrolytic solution into the interior of the outer container member. As a result, it took 2 minutes to complete vacuum impregnating. Thereafter, the outer container member was caulked in a state that the lid member had been put on the outer container member to close the container member, thereby forming an outer container. In this manner, 3 cylindrical wound-type LICs were fabricated.

(5) Initial Evaluation of Wound-Type LIC

Among the 3 wound-type LICs fabricated, one wound-type LIC was disassembled after left to stand for 7 days from the fabrication. As a result, it was confirmed that the lithium metal foils, which are lithium ion sources, are lost. From this fact, it is judged that the negative electrode was doped with a predetermined amount of lithium ions after 7 days elapsed from the fabrication.

(6) Evaluation of Properties of Wound-Type LIC

The 2 wound-type LICs were each subjected for 0.5 hours to constant-current-constant-voltage charge that charging is conducted at a constant current of 750 mA until the voltage of the capacitor becomes 3.8 V and a constant voltage of 3.8 V is then applied. Discharging was then conducted at a constant current of 750 mA until the voltage of the capacitor became 2.2 V. These operations were regarded as one cycle, and the cycle was repeated to measure a capacity of the capacitor, an energy density and an internal resistance upon discharging of the tenth cycle, thereby calculating the respective average values of the 2 wound-type LICs. The results are shown in the following Table 4.

TABLE 4

| | Capacitance (F) | Energy density (Wh/L) | Internal resistance (mΩ) |
|---|---|---|---|
| Example 2 | 167 | 13.5 | 27 |

As apparent from the above results, it was confirmed that according to Example 2, the preparation of the wound electrode unit is easy, the electrolytic solution is penetrated in a short period of time, the whole negative electrode is uniformly doped with lithium ions in a short period of time, resulting in achieving high productivity, and a wound-type LIC high in both capacitance and energy density and low in internal resistance is obtained.

Comparative Example 3

A wound electrode unit was prepared in the same manner as in Example 1 except that a lithium metal foil having a size of 5.4 cm in length and 1.0 cm in width and a thickness of 135 μm was used as the lithium ion source arranged on the inner peripheral surface of the wound electrode unit, and a lithium metal foil having a size of 5.4 cm in length and 5.0 cm in width and a thickness of 135 μm was used as the lithium ion source arranged on the outer peripheral surface of the wound electrode unit, and 3 wound-type LICs were fabricated.

In the above, proportions of regions (non-occupied regions) not covered with the lithium ion source in the inner peripheral surfaces of the outermost peripheral portion and the innermost peripheral portion in the wound electrode unit were each 0%.

In the fabrication of the wound-type LIC, the electrolytic solution was injected to conduct vacuum impregnating. As a result, it took 4 minutes to complete it.

With respect to the wound-type LICs fabricated, initial evaluation was made in the same manner as in Example 2. As a result, it was confirmed that the lithium metal foils remain.

With respect to the wound-type LICs fabricated, evaluation of properties was made in the same manner as in Example 2. The results are shown in the following Table 5.

TABLE 5

|  | Capacitance (F) | Energy density (Wh/L) | Internal resistance (mΩ) |
|---|---|---|---|
| Comparative Example 3 | 165 | 13.3 | 28.6 |

From the above results, it took a long time to penetrate the electrolytic solution compared with Example 2 because the proportions of the non-occupied regions were 0% in Comparative Example 3. In addition, it took a long time to uniformly dope the whole negative electrode with lithium ions.

Comparative Example 4

A negative electrode and a positive electrode were prepared in the same manner as in Example 2.

The negative electrode prepared was cut into a size of 5.6 cm in width and 49.3 cm in length in such a manner that the uncoated portion of the negative electrode current collector is included at a position of 10 mm from the end, and a nickel negative electrode terminal was then arranged on the uncoated portion of the negative electrode current collector and connected thereto by ultrasonic welding.

The positive electrode prepared was cut into a size of 5.4 cm in width and 46.3 cm in length in such a manner that the uncoated portion of the positive electrode current collector is included at a position of 10 mm from the end, and an aluminum positive electrode terminal was arranged on the uncoated portion of the positive electrode current collector and connected thereto by ultrasonic welding.

A first separator and a second separator, which were each composed of a cellulose/rayon-mixed nonwoven fabric having a thickness of 35 μm, were provided, and the first separator, the negative electrode, the second separator and the positive electrode were stacked in this order, thereby forming an electrode stack. Here, the positive electrode and negative electrode were arranged in such a manner that the respective electrode layers are opposed to each other through the second separator. This electrode stack was wound on an aluminum shaft having a diameter of 3.5 mm from one end of the electrode stack in such a manner that the first separator comes to an inner side, thereby preparing a wound electrode unit having an inner diameter of 3.5 mm and an outer diameter of 15.5 mm, and tapes were wound on this wound electrode unit, thereby fixing the wound electrode unit.

A lithium electrode current collector composed of copper expanded metal having a size of 5.4 cm in length and 5.0 cm in width and a thickness of 32 μm was then bonded under pressure to a lithium ion source composed of a lithium metal foil having a size of 5.4 cm in length and 5.0 cm in width and a thickness of 134 μm, and the lithium ion source, to which the lithium electrode current collector had been bonded under pressure, was arranged so as to face the outer peripheral surface of the wound electrode unit. A lithium electrode current collector composed of copper expanded metal having a size of 5.4 cm in length and 1.0 cm in width and a thickness of 32 μm was then bonded under pressure to a lithium ion source composed of a lithium metal foil having a size of 5.4 cm in length and 1.0 cm in width and a thickness of 134 μm, and the lithium ion source, to which the lithium electrode current collector had been bonded under pressure, was arranged so as to face the inner peripheral surface of the wound electrode unit.

Proportions of regions (non-occupied regions) not covered with the lithium ion source in the inner peripheral surface and outer peripheral surface of the wound electrode unit were each 0%.

In the above, it took a long time to arrange the lithium ion sources.

An iron-nickel plated bottomed cylindrical outer container member having an outer diameter of 18 mm and a height of 65 mm was provided, and the wound electrode unit prepared was housed into the interior of this outer container member, the negative electrode terminal of the wound electrode unit was resistance-welded to an inner bottom of the outer container member, and grooving work was then performed at an upper portion of the outer container member. After a polypropylene gasket was then fitted at the upper portion of the outer container member, the positive electrode terminal of the wound electrode unit was resistance-welded to a lid member. Nine grams of a solution with $LiPF_6$ dissolved in propylene carbonate at a concentration of 1 mol/L was injected as an electrolytic solution into the interior of the outer container member. As a result, it took 3 minutes to complete vacuum impregnating. Thereafter, the outer container member was caulked in a state that the lid member had been put on the outer container member to close the container member, thereby forming an outer container. In this manner, 3 cylindrical wound-type LICs were fabricated.

With respect to the wound-type LICs fabricated, initial evaluation was made in the same manner as in Example 2. As a result, it was confirmed that the lithium metal foils remain. The disassembled wound-type LIC was assembled, the re-assembled wound-type LIC was left to stand for 2 days (left to stand for 9 days in total), and this wound-type LIC was then disassembled again. As a result, it was confirmed that the lithium metal foils, which are lithium ion sources, are lost. From this fact, it is judged that the negative electrode was doped with a predetermined amount of lithium ions after 9 days elapsed from the fabrication. With respect to the wound-type LICs fabricated, evaluation of properties was also made in the same manner as in Example 2. The results are shown in the following Table 6.

TABLE 6

|  | Capacitance (F) | Energy density (Wh/L) | Internal resistance (mΩ) |
|---|---|---|---|
| Comparative Example 4 | 165 | 133 | 31.0 |

From the above results, it took a long time to penetrate the electrolytic solution compared with Example 2 because the proportions of the non-occupied regions were 0% in Comparative Example 4. In addition, it took a long time to uniformly dope the whole negative electrode with lithium ions. Further, the internal resistance of the resultant wound-type LIC was high. This is considered to be attributable to the fact that a contact pressure between the wound electrode unit and the lithium ion sources was insufficient because the lithium ion sources were arranged after the wound electrode unit was prepared.

DESCRIPTION OF CHARACTERS

10 Wound electrode unit
10A Electrode stack

11 Positive electrode
111, 112 Positive electrode pieces
11S Intra-positive electrode space
11a Positive electrode current collector
11b Electrode layer
11c Primer layer
12 Negative electrode
12S Intra-negative electrode space
121, 122 Negative electrode pieces
121α Marginal portion
12a Negative electrode current collector
12b Electrode layer
12c Primer layer
13A, 13B Separators
14A First separator
14a Innermost peripheral portion
14B Second separator
14b Outermost peripheral portion
15A, 15B Lithium ion sources
15a, 15b Lithium electrode current collector
16A to 16C Lithium ion sources
17 Positive electrode terminal
18 Negative electrode terminal
19 Shaft
20 Outer container
25 Tape
26a to 26c Lithium electrode current collector
30A Electrode stack
31 Positive electrode
31T Slit
36C Lithium ion source
41 Positive electrode
411, 412 Positive electrode pieces
41S Intra-positive electrode space
41Q Second belt-like material
42 Negative electrode
43A, 43B Separators
42Q First belt-like material
50 Wound electrode unit
50A Electrode stack
51 Positive electrode
511, 512 Positive electrode pieces
51S Intra-positive electrode space
51Q Second belt-like material
52 Negative electrode
521, 522 Negative electrode pieces
52S Intra-negative electrode space
52Q First belt-like material
53A, 53B Separators
60A Electrode stack
61 Positive electrode
611, 612 Positive electrode pieces
61S Intra-positive electrode space
61Q Second belt-like material
62 Negative electrode
62Q First belt-like material
63A, 63B Separators
P Pore
R Non-occupied region
S Intermittent portion
Z Chain line

The invention claimed is:
1. A wound-type accumulator, comprising:
a cylindrical wound electrode unit, comprising
a positive electrode comprising a positive electrode layer containing a positive electrode active material configured to reversibly support lithium ions and/or anions formed on at least one surface of a current collector having pores passing through from a front surface to a back surface,
a negative electrode comprising a negative electrode layer containing a negative electrode active material configured to reversibly support lithium ions formed on at least one surface of a current collector having pores passing through from a front surface to a back surface,
at least one lithium ion source, which does not physically contact the positive electrode layer, and
at least one separator, wherein
the positive electrode further comprises regions of the positive electrode layer separated by one or more intra-positive electrode spaces disposed between said regions, and the negative electrode further comprises regions of the negative electrode layer separated by one or more intra-negative electrode spaces disposed between said regions, the at least one lithium ion source being disposed at one or more positions in the one or more intra-negative electrode spaces opposed to the one or more intra-positive electrode spaces through the at least one separator, or
the positive electrode further comprises regions of the positive electrode layer separated by one or more intra-positive electrode spaces disposed between said regions, and the negative electrode further comprises a continuous region of the negative electrode layer without the one or more intra-negative electrode spaces, the at least one lithium ion source being disposed at one or more positions on the continuous region of the negative electrode layer opposed to the one or more intra-positive electrode spaces through the at least one separator, or
the positive electrode further comprises regions of the positive electrode layer separated by one or more intra-positive electrode spaces disposed between said regions, and the negative electrode further comprises a continuous region of the negative electrode layer without the one or more intra-negative electrode spaces, the at least one lithium ion source being disposed at one or more positions in the one or more intra-positive electrode spaces opposed to the continuous region of the negative electrode layer through the at least one separator,
the cylindrical wound electrode unit being configured by a wound electrode stack comprising the positive electrode, the negative electrode, and the at least one separator disposed therebetween, said stack being wound from an end thereof about an axis perpendicular to a stacking direction; and
an electrolytic solution composed of an aprotic organic solvent electrolyte solution of a lithium salt,
wherein the negative electrode and/or the positive electrode is doped with lithium ions by electrochemical contact of the at least one lithium ion source with the negative electrode and/or the positive electrode,
wherein the at least one separator comprises a first separator and a second separator, the wound electrode stack comprises, in order, the first separator, the negative electrode, the second separator, and the positive electrode, and the at least one lithium ion source is provided on an inner surface of the second separator disposed at an outermost periphery of the cylindrical wound elec- trode unit, and on an inner surface of the first separator disposed at an innermost periphery of the cylindrical wound electrode unit, and wherein intermittent proportions of regions not covered with the at least one lithium ion source at the inner surface of the second separator disposed at the outermost periphery of the cylindrical wound electrode unit, and at the inner surface of the first separator disposed at the innermost periphery of the cylindrical wound electrode unit, comprise 10% to 70% of a peripheral surface of the cylindrical wound electrode unit.

2. The wound-type accumulator according to claim 1, wherein the at least one lithium ion source is provided on an inner surface of the at least one separator disposed at an outermost periphery of the cylindrical wound electrode unit, and/or on an inner surface of the at least one separator disposed at an innermost periphery of the cylindrical wound electrode unit.

3. The wound-type accumulator according to claim 2, wherein the cylindrical wound electrode unit is further configured by providing a partially wound body of the at least one lithium ion source disposed on the inner surface of the at least one separator with a covering comprising the negative electrode, and providing a completed wound body comprising a wound stack of the partially wound body wound with the positive electrode.

4. The wound-type accumulator according to claim 2 or claim 3, wherein the negative electrode is superimposed on at least a part of the positive electrode.

5. The wound-type accumulator according to claim 2, wherein the at least one lithium ion source provided on the inner surface of the at least one separator disposed at the outermost periphery of the cylindrical wound electrode unit is covered with the negative electrode.

6. The wound-type accumulator according to claim 1, wherein the regions of the positive electrode layer comprise a plurality of positive electrode pieces, and adjacent positive electrode pieces are disposed with the one or more intra-positive electrode spaces therebetween in a plane of the positive electrode layer parallel to the stacking direction.

7. The wound-type accumulator according to claim 1, wherein the one or more intra-positive electrode spaces are slits formed in the positive electrode.

8. The wound-type accumulator according to claim 1, wherein the wound electrode stack is wound from the end thereof about the axis perpendicular to the stacking direction.

9. The wound-type accumulator according to any one of claims 2, 3, or 8, wherein the at least one lithium ion source is bonded under pressure to, or stacked on, a lithium electrode current collector.

10. The wound-type accumulator according to claim 9, wherein the lithium electrode current collector is composed of a porous foil.

11. The wound-type accumulator according to any one of claims 2, 3, or 8, which is a lithium ion capacitor.

12. The wound-type accumulator according to any one of claims 2, 3, or 8, which is a lithium ion secondary battery.

13. The wound-type accumulator according to claim 1, wherein in the cylindrical wound electrode unit, the at least one lithium ion source provided on the inner surface of the second separator disposed at the outermost periphery of the cylindrical wound electrode unit covers the negative electrode.

* * * * *